(12) United States Patent
Fukumoto et al.

(10) Patent No.: US 11,054,609 B2
(45) Date of Patent: Jul. 6, 2021

(54) BINOCULARS AND OCULAR LENS

(71) Applicant: NIKON VISION CO., LTD., Tokyo (JP)

(72) Inventors: Satoshi Fukumoto, Yokohama (JP); Katsunori Tomita, Machida (JP); Tatsushi Nishioka, Fujisawa (JP)

(73) Assignee: NIKON VISION CO., LTD., Tokyo (JP)

( * ) Notice: Subject to any disclaimer, the term of this patent is extended or adjusted under 35 U.S.C. 154(b) by 240 days.

(21) Appl. No.: 16/323,152

(22) PCT Filed: Jul. 28, 2017

(86) PCT No.: PCT/JP2017/027472
§ 371 (c)(1),
(2) Date: Feb. 4, 2019

(87) PCT Pub. No.: WO2018/025768
PCT Pub. Date: Feb. 8, 2018

(65) Prior Publication Data
US 2019/0170997 A1 Jun. 6, 2019

(30) Foreign Application Priority Data

Aug. 4, 2016 (JP) .............................. JP2016-154086
Aug. 5, 2016 (JP) .............................. JP2016-154195

(51) Int. Cl.
| | |
|---|---|
| *G02B 9/12* | (2006.01) |
| *G02B 9/20* | (2006.01) |
| *G02B 9/64* | (2006.01) |
| *G02B 9/14* | (2006.01) |
| *G02B 9/34* | (2006.01) |
| *G02B 23/18* | (2006.01) |
| *G02B 15/14* | (2006.01) |
| *G02B 9/10* | (2006.01) |

(52) U.S. Cl.
CPC ................. *G02B 9/12* (2013.01); *G02B 9/14* (2013.01); *G02B 9/20* (2013.01); *G02B 9/34* (2013.01);
(Continued)

(58) Field of Classification Search
CPC . G02B 23/18; G02B 9/10; G02B 9/14; G02B 9/20; G02B 9/34; G02B 15/1445;
(Continued)

(56) References Cited

U.S. PATENT DOCUMENTS

| | | |
|---|---|---|
| 5,748,380 A | 5/1998 | Yanari |
| 2009/0174939 A1 | 7/2009 | Heintz et al. |

(Continued)

FOREIGN PATENT DOCUMENTS

| | | |
|---|---|---|
| JP | H11-064738 A | 3/1999 |
| JP | 3077005 U | 5/2001 |

(Continued)

OTHER PUBLICATIONS

Aug. 7, 2019 Japanese Office Action issued in Japense Patent Application No. 2018-531866.
Oct. 31, 2017 International Search Report issued in International Patent Application No. PCT/JP2017/027472.
(Continued)

*Primary Examiner* — Kristina M Deherrera
(74) *Attorney, Agent, or Firm* — Oliff PLC

(57) ABSTRACT

An ocular lens includes from an object side: a first lens group having negative refracting power, and a second lens group having positive refracting power. An object-side focal plane of the second lens group is positioned between the first lens group and the second lens group. The first lens group includes, from the object side: a meniscus first A lens component whose convex surface is directed toward the object side, and a first B lens component having negative refracting power. The second lens group includes, in a position closest to the object side, a meniscus second A lens component whose concave surface is directed toward the object side, and satisfies conditional expressions.

13 Claims, 20 Drawing Sheets

(52) U.S. Cl.
CPC .............. *G02B 9/64* (2013.01); *G02B 23/18* (2013.01); *G02B 9/10* (2013.01); *G02B 15/1425* (2019.08); *G02B 15/1445* (2019.08); *G02B 15/1465* (2019.08); *G02B 15/143105* (2019.08)

(58) Field of Classification Search
CPC .. G02B 9/64; G02B 15/1465; G02B 15/1425; G02B 15/143105; G02B 9/12
USPC ........................................ 359/413, 691, 793
See application file for complete search history.

(56) References Cited

U.S. PATENT DOCUMENTS

| | | |
|---|---|---|
| 2013/0107374 A1 | 5/2013 | Fukumoto |
| 2013/0308208 A1 | 11/2013 | Fukumoto |
| 2015/0055216 A1 | 2/2015 | Fukumoto |

FOREIGN PATENT DOCUMENTS

| | | |
|---|---|---|
| JP | 2003-121760 A | 4/2003 |
| JP | 2013-210465 A | 10/2013 |
| JP | 2016-071276 A | 5/2016 |

OTHER PUBLICATIONS

Feb. 5, 2019 International Preliminary Report on Patentability issued in International Patent Application No. PCT/JP2017/027472.
Apr. 28, 2020 Extended European Search Report issued in European Patent Application No. 17836873.4.
Mar. 6, 2020 Supplementary Partial European Search Report issued in European Patent Application No. 17836873.

[FIG 1]
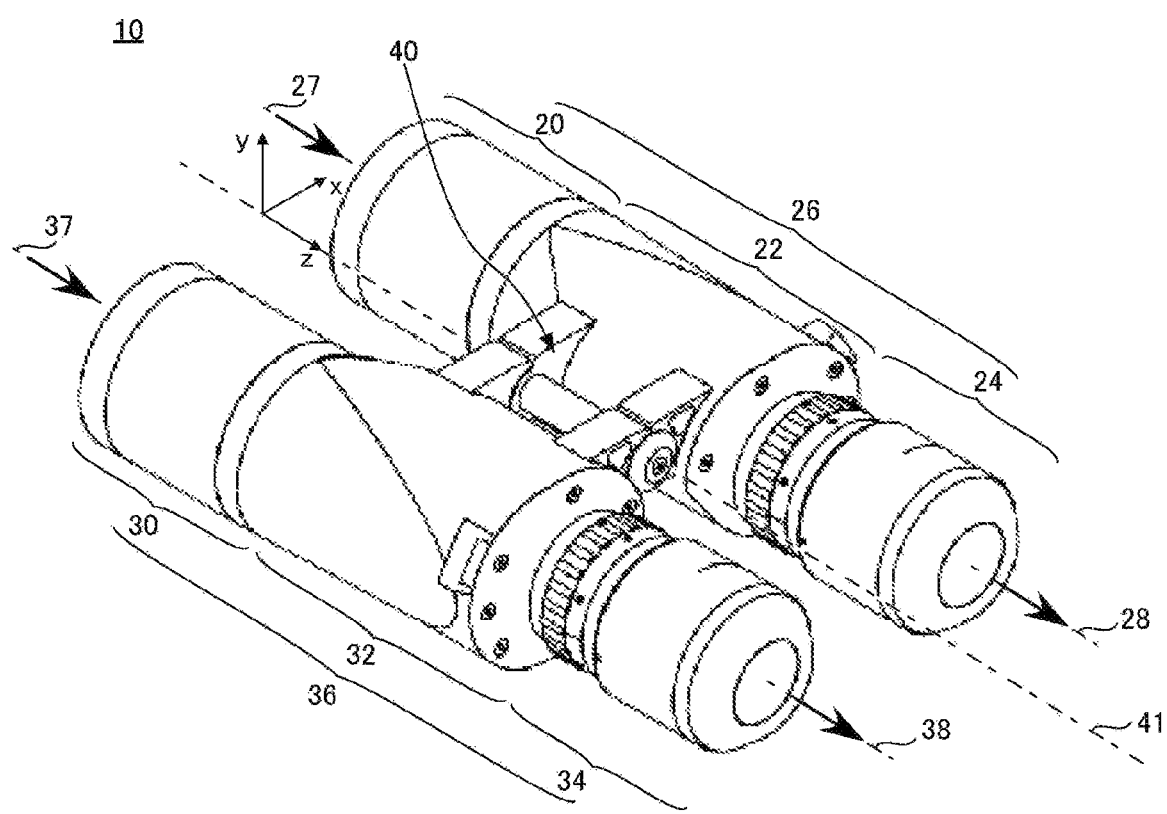

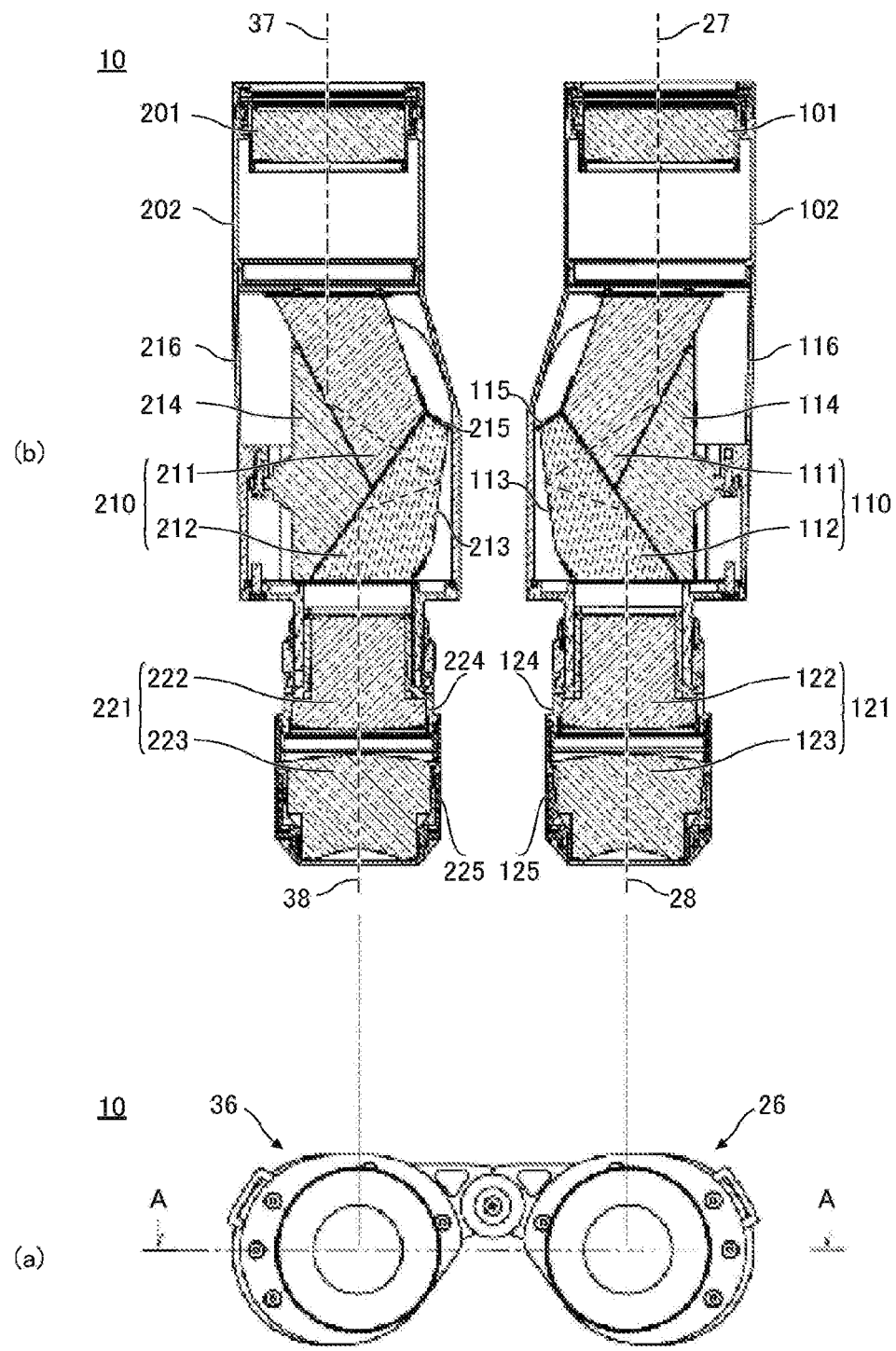
[FIG 2]

[FIG 3]
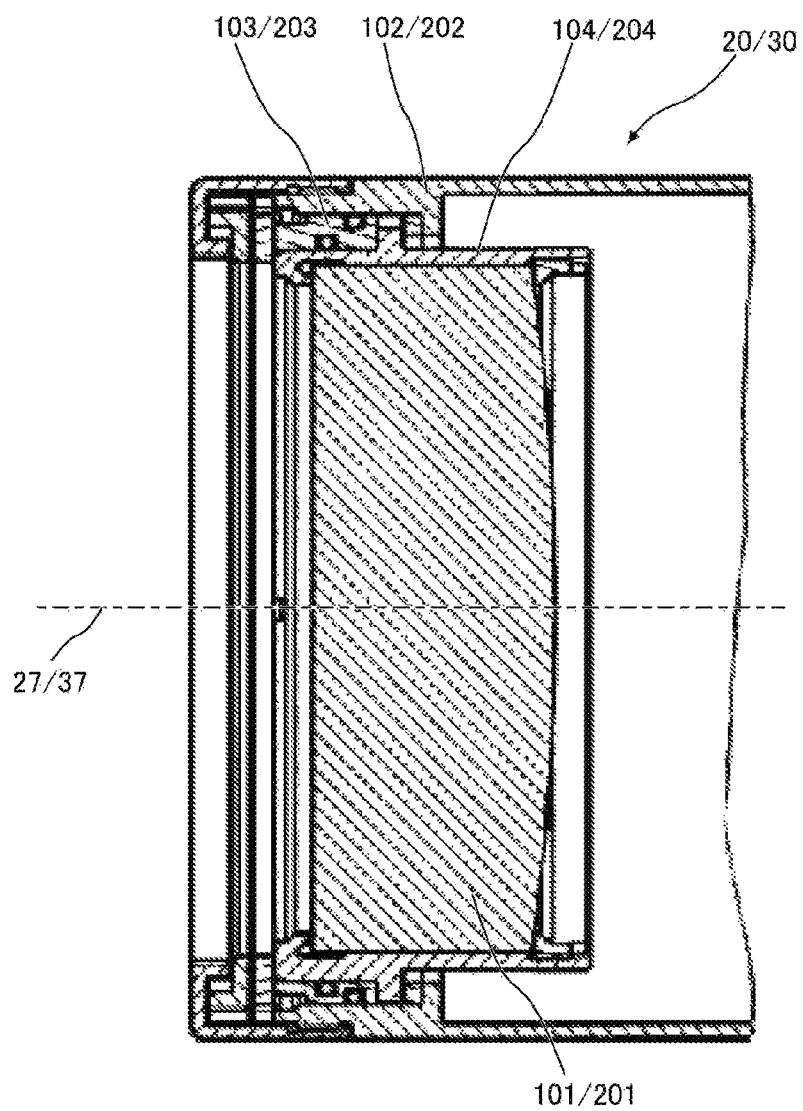

[FIG 4]
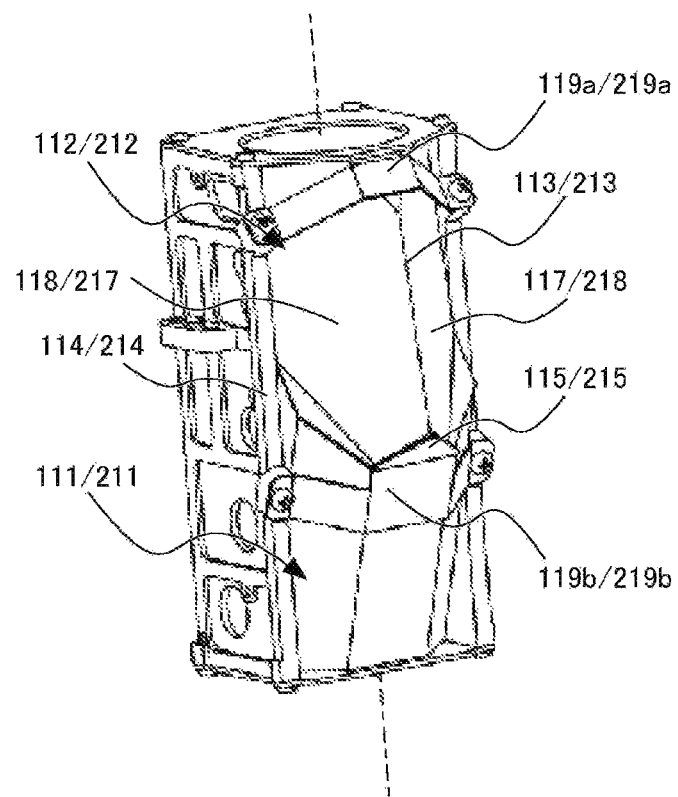

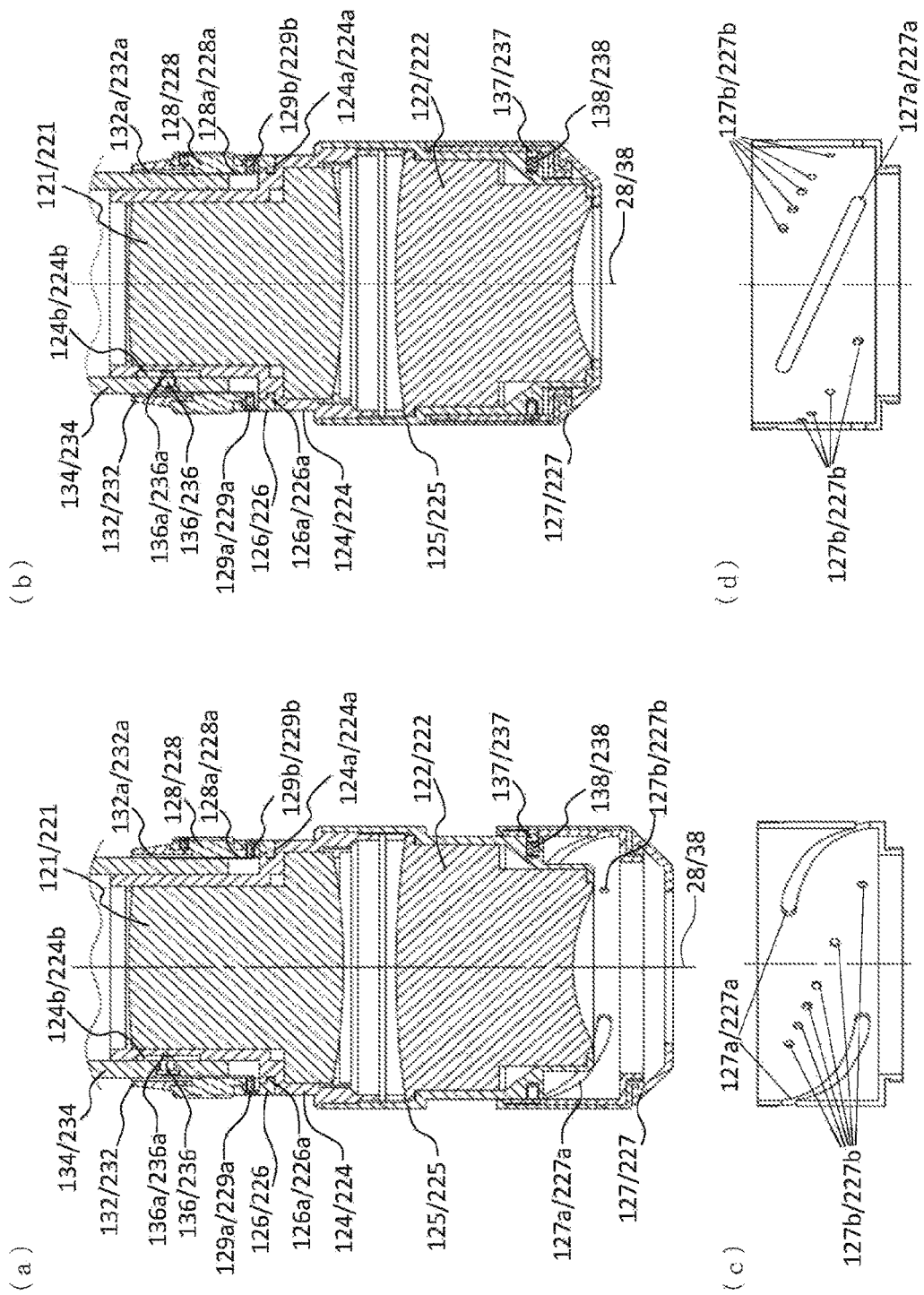
[FIG 5]

[FIG 6]
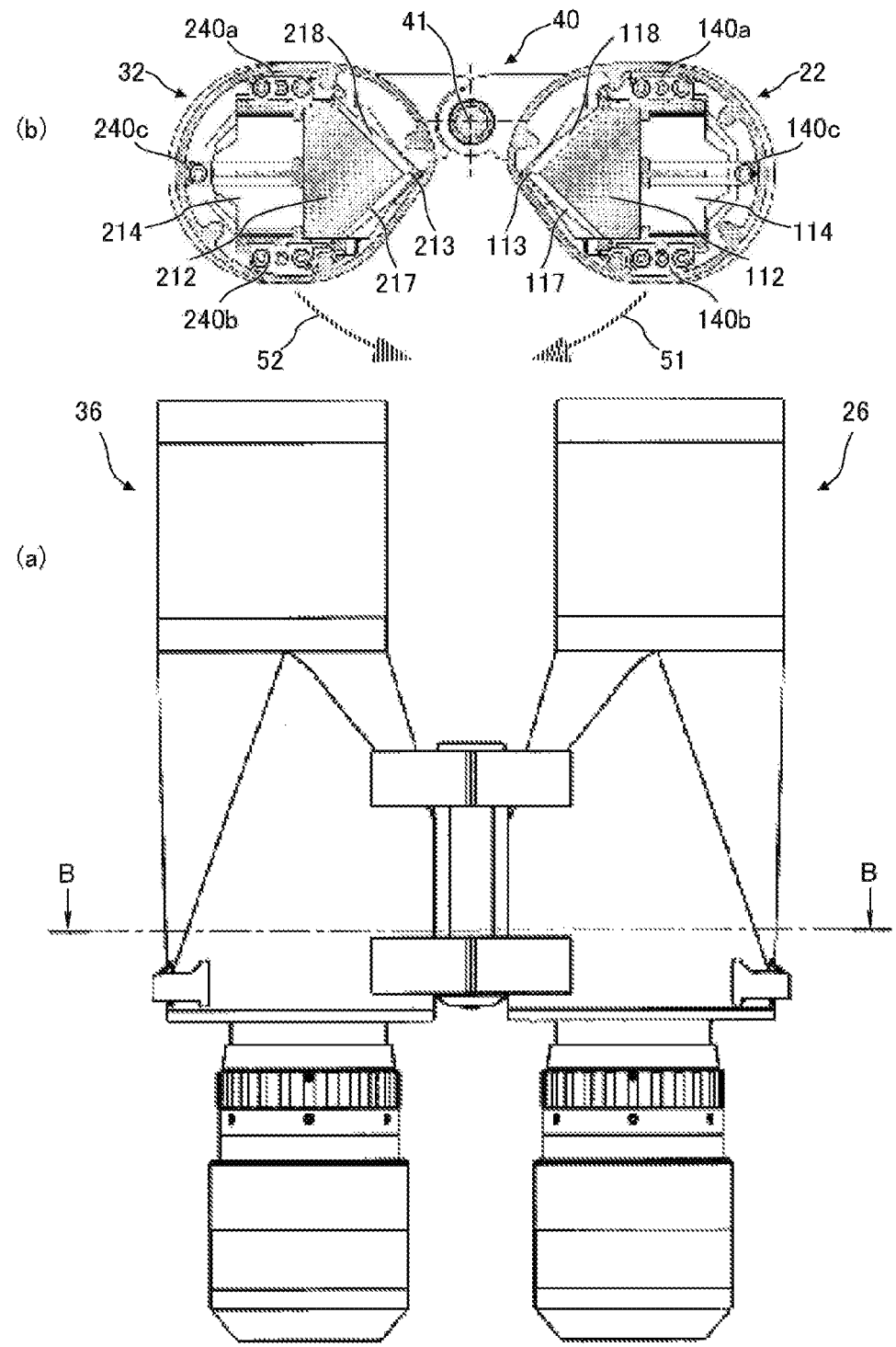

[FIG 7]
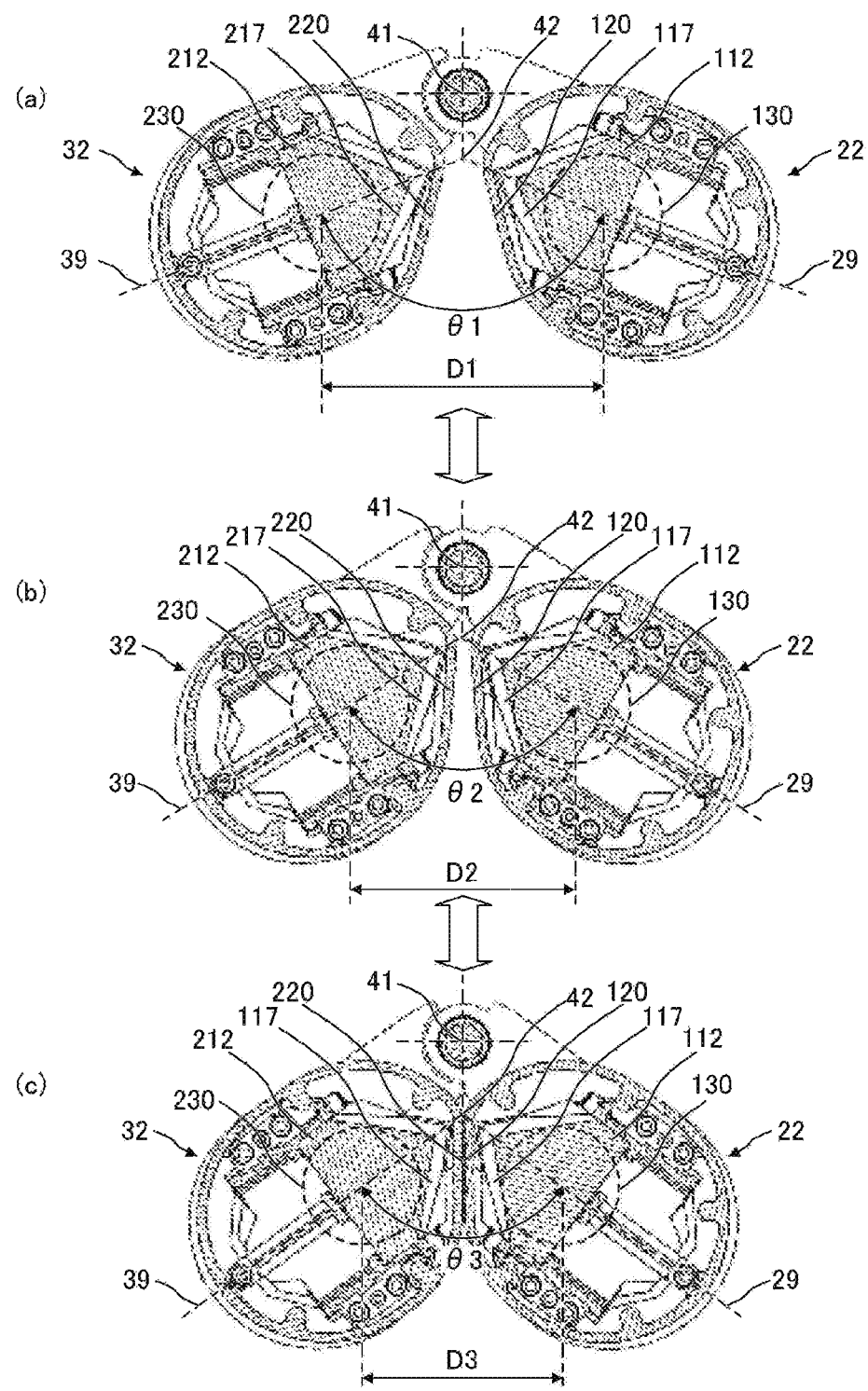

[FIG 8]
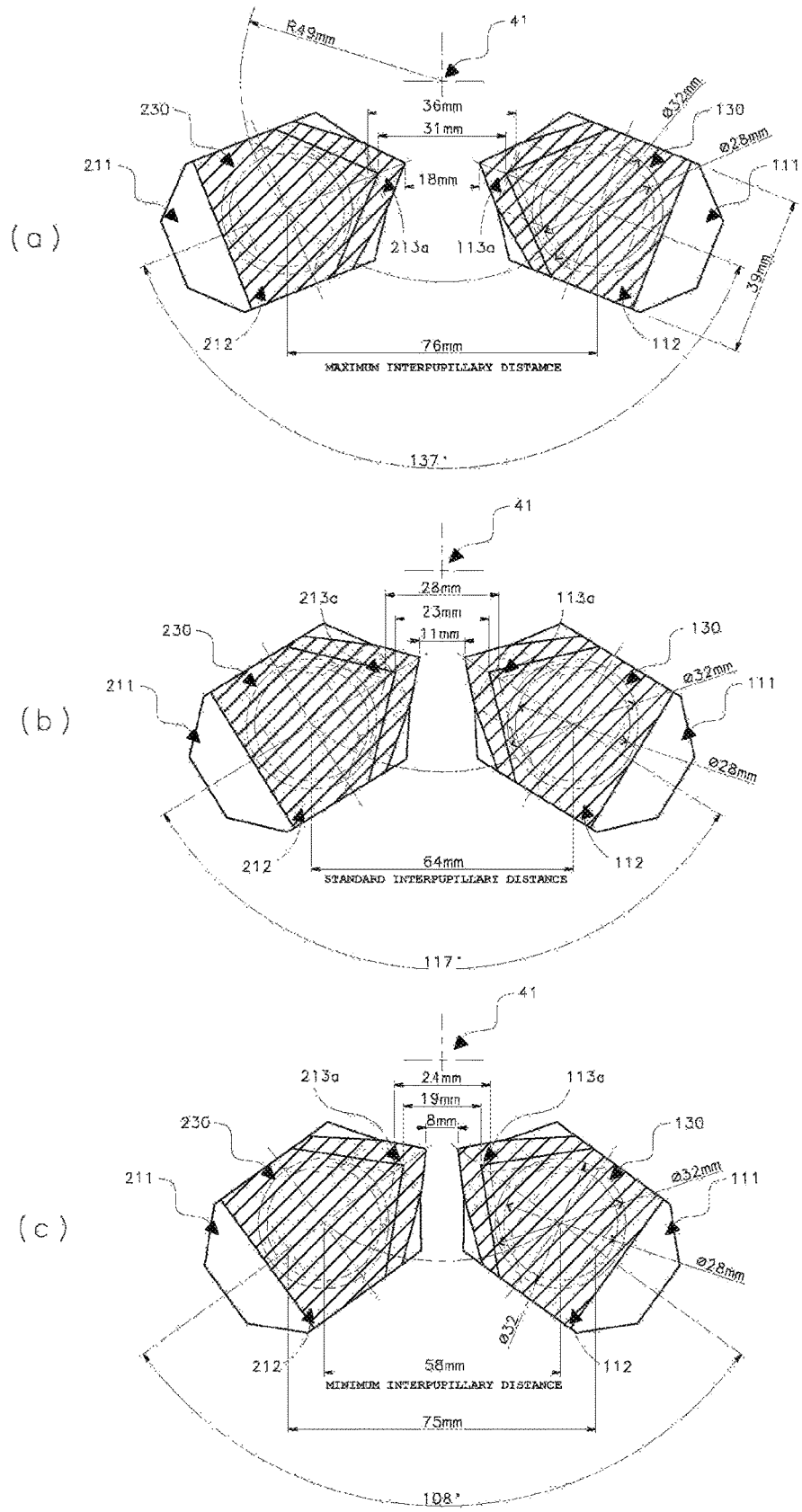

[FIG 9]
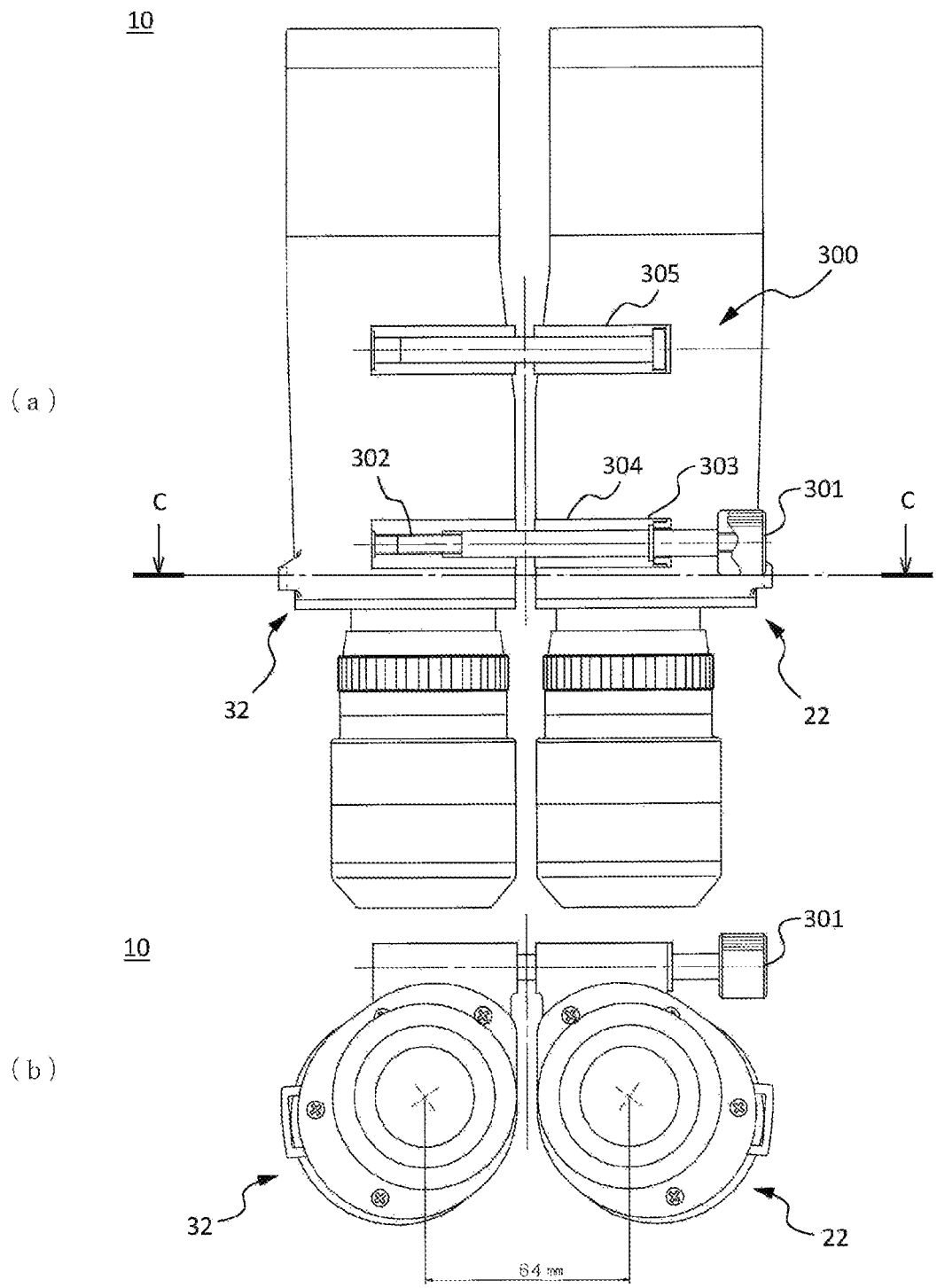

[FIG 10]
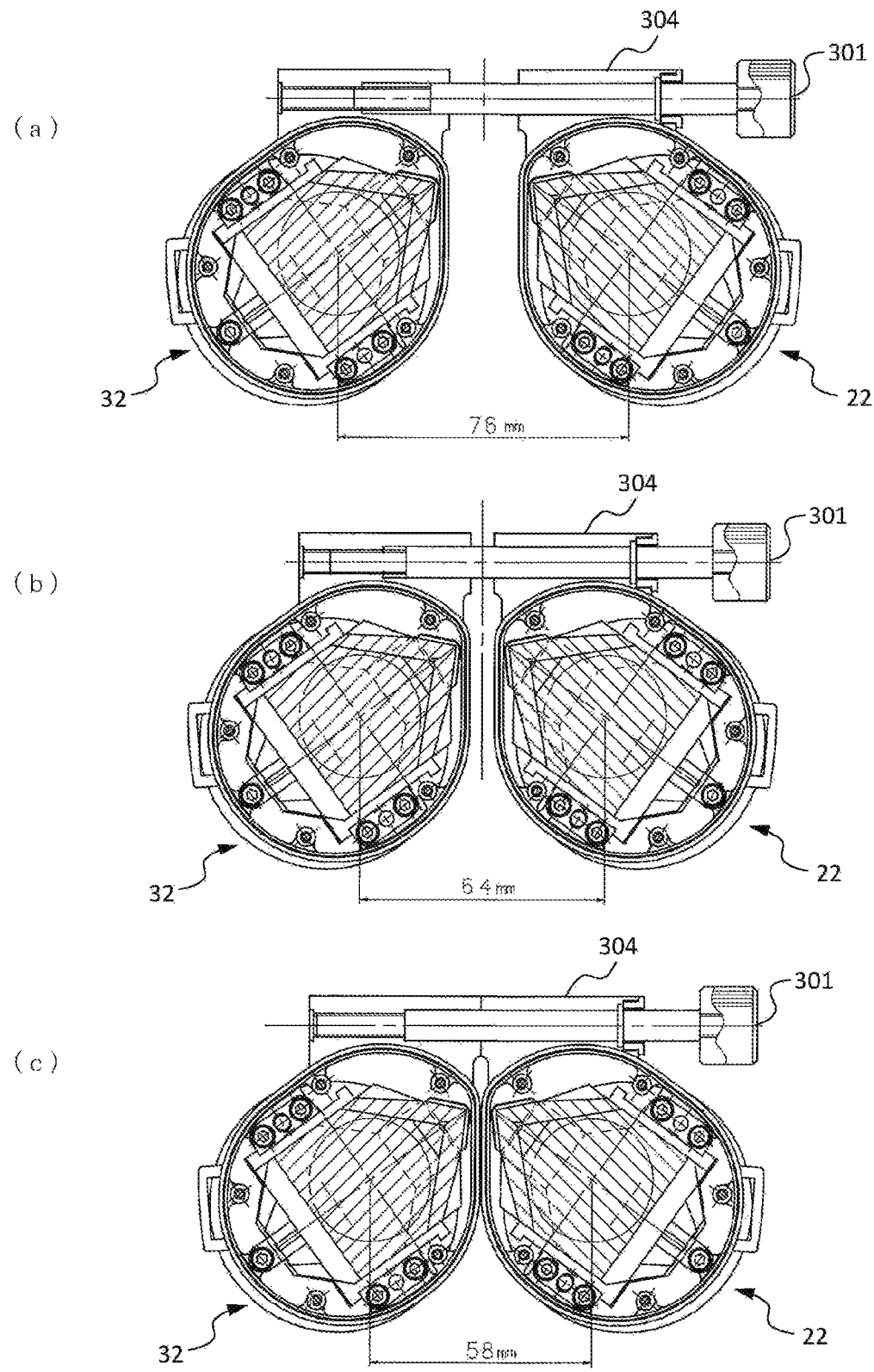

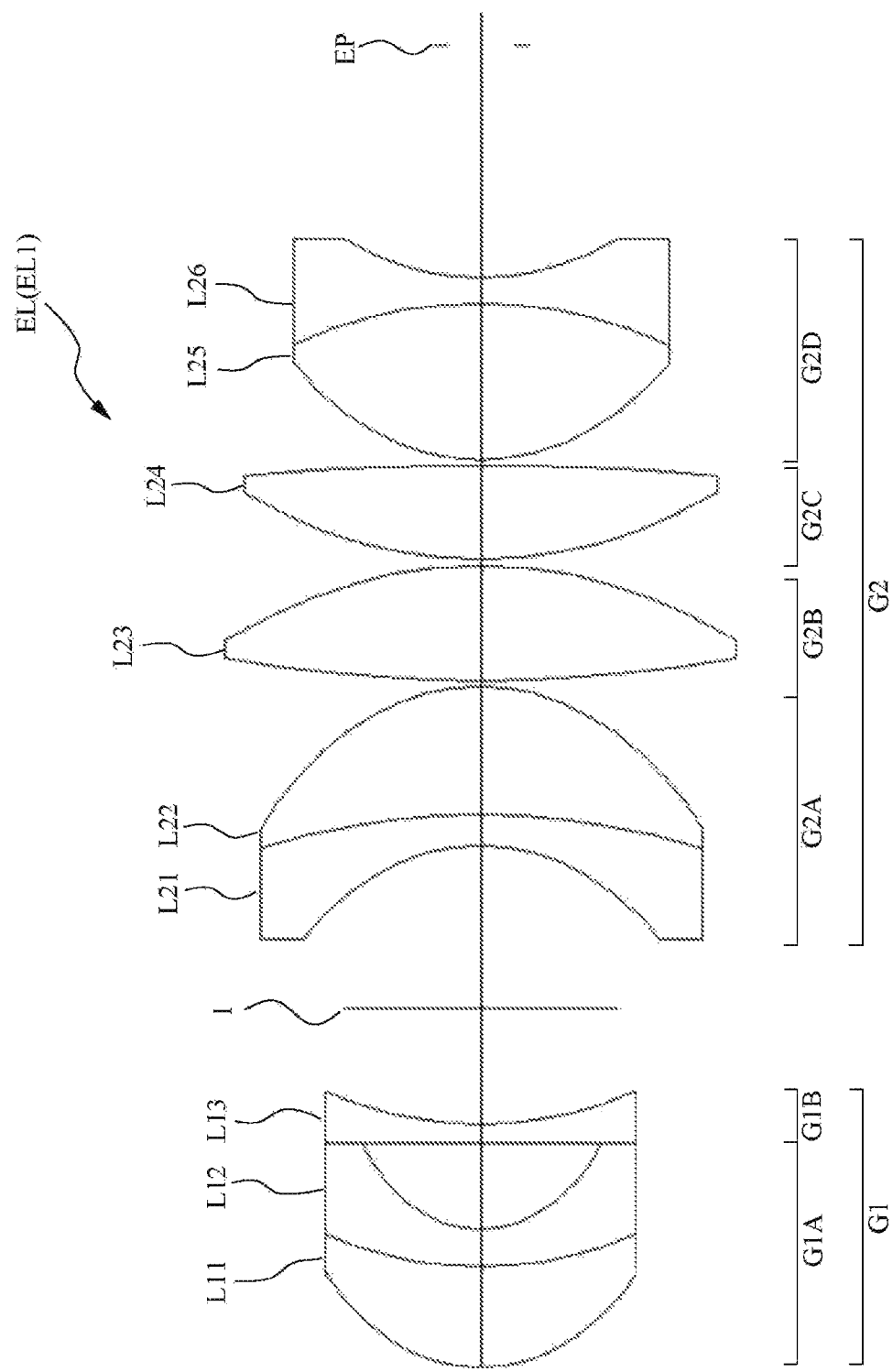
[FIG 11]

[FIG 12]
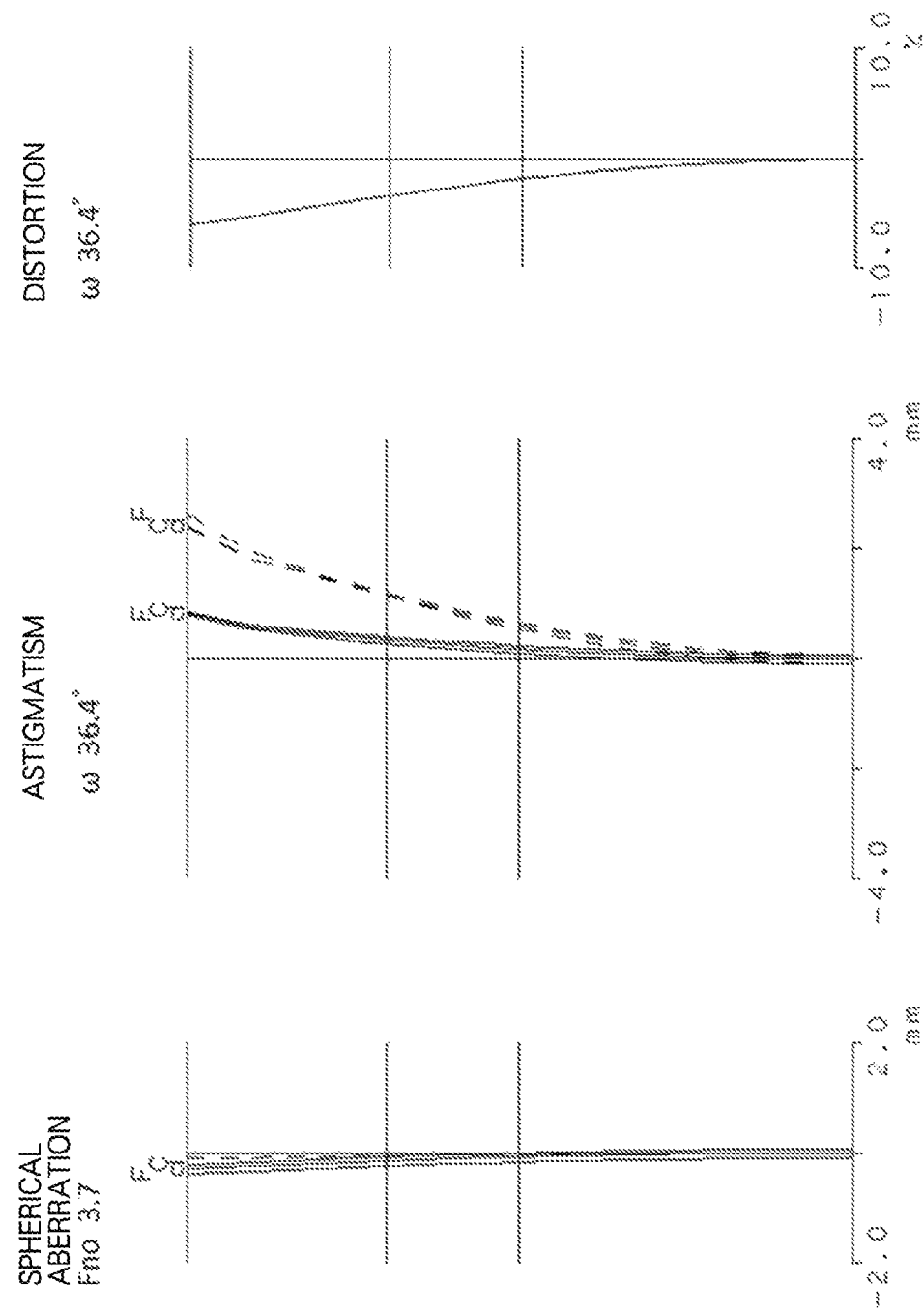

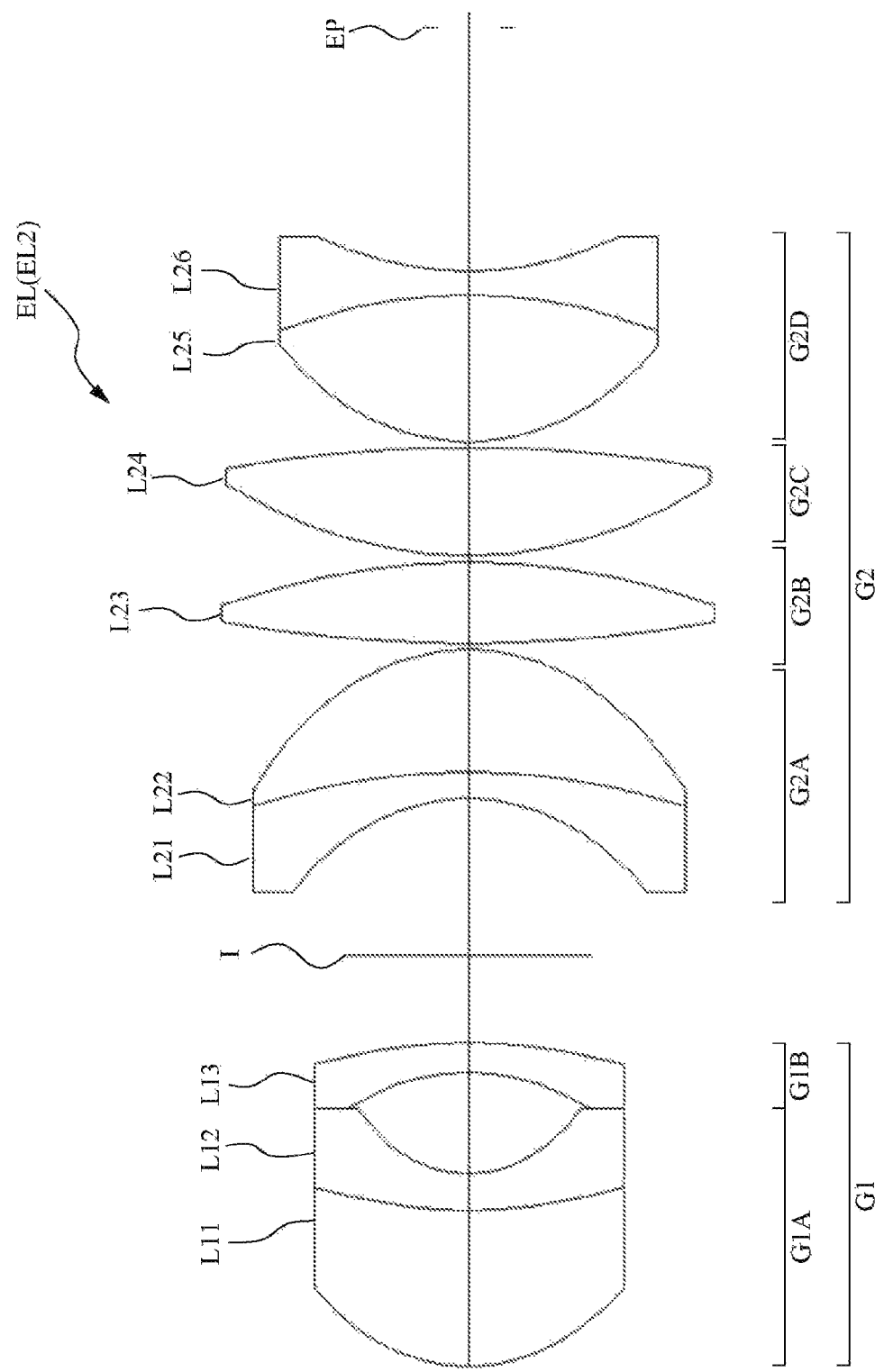
[FIG 13]

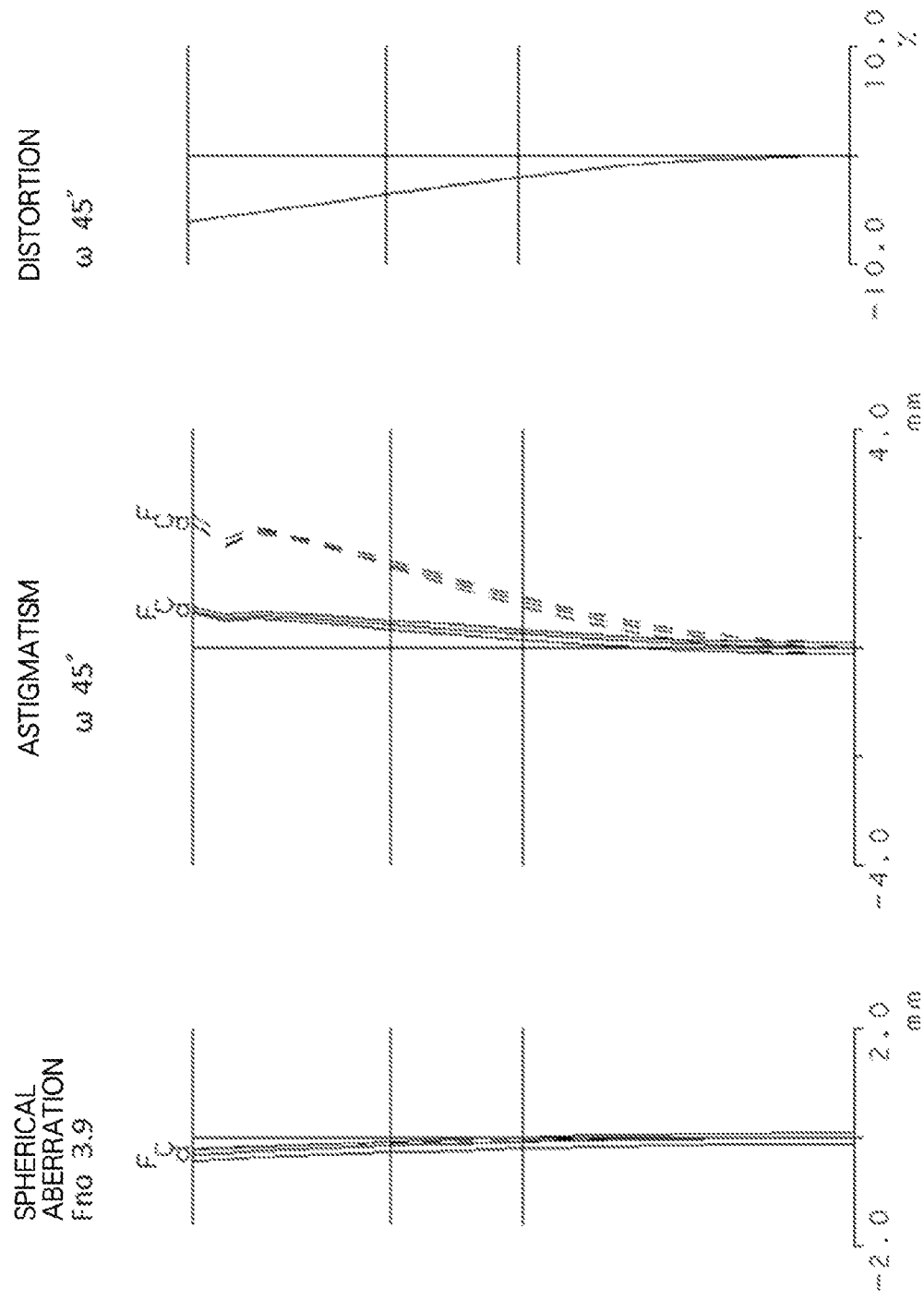
[FIG 14]

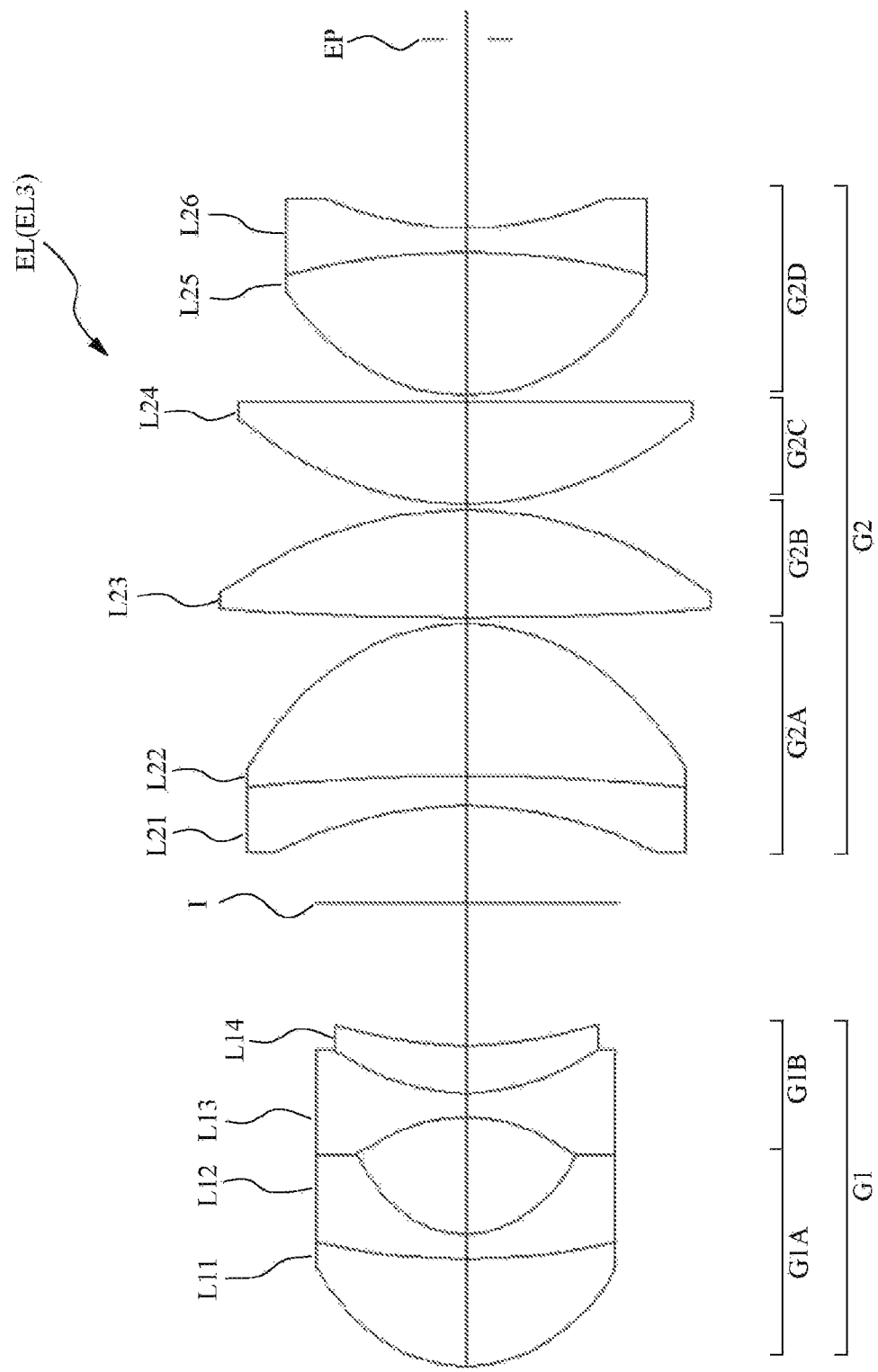
[FIG 15]

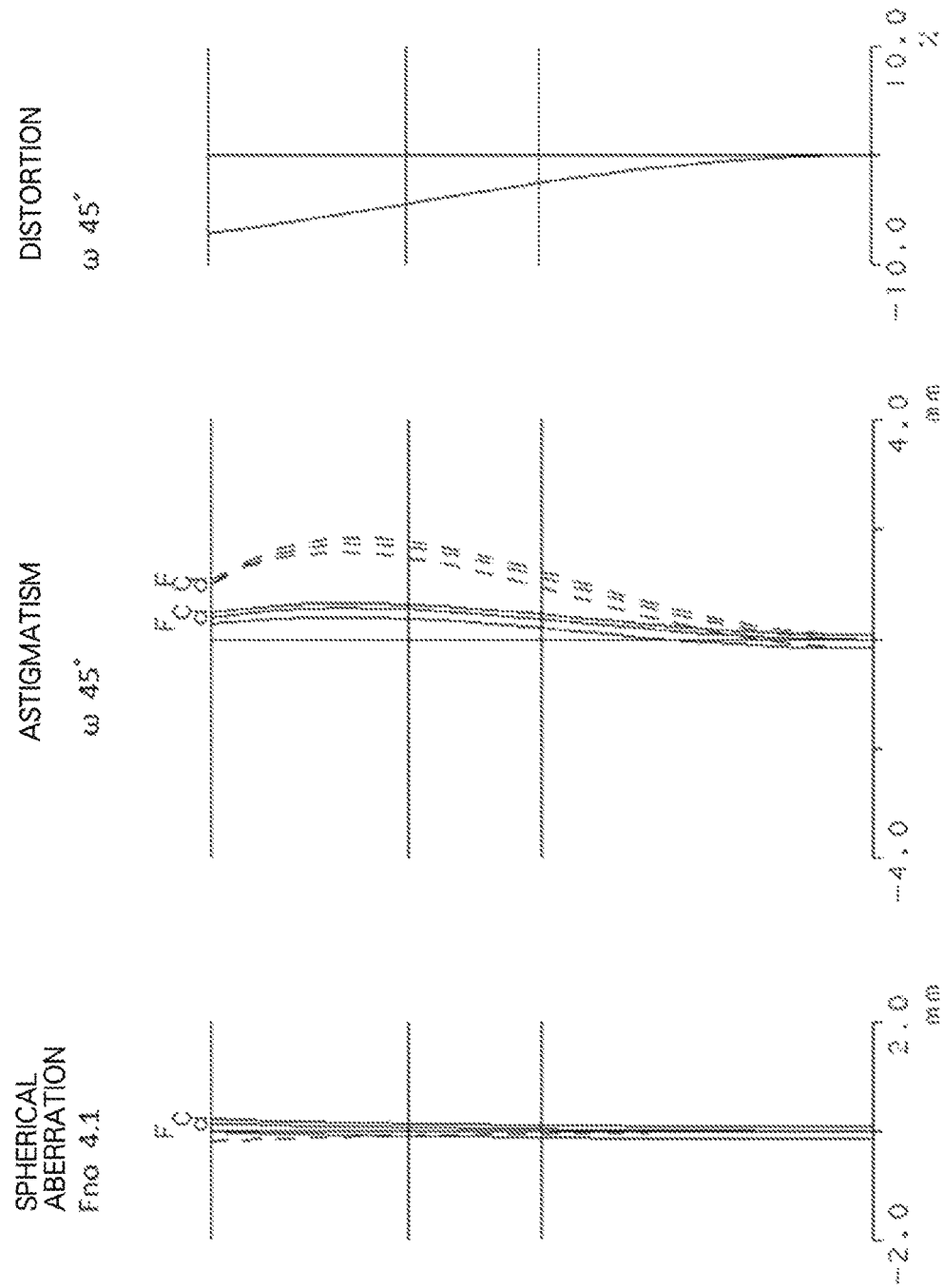
[FIG 16]

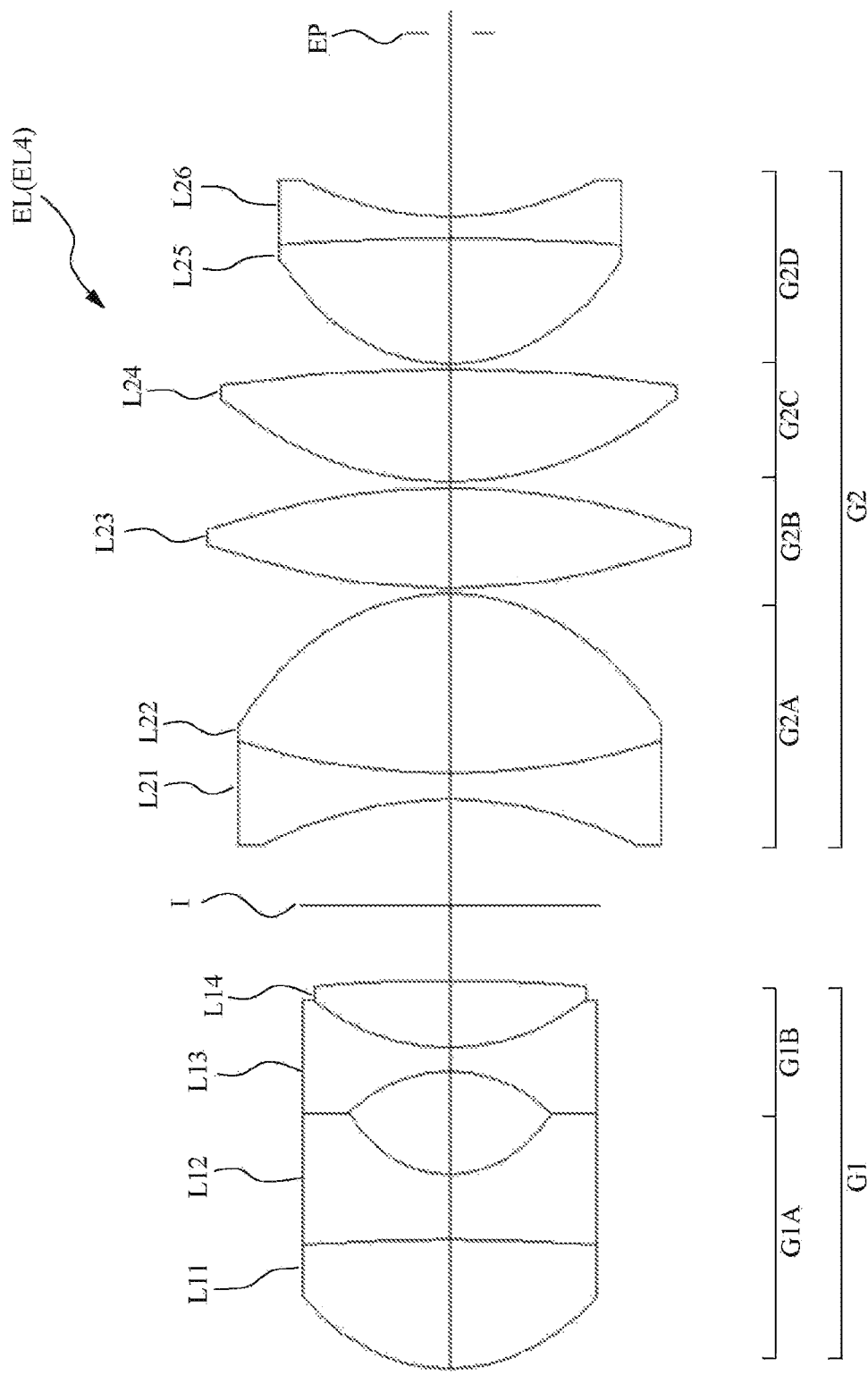
[FIG 17]

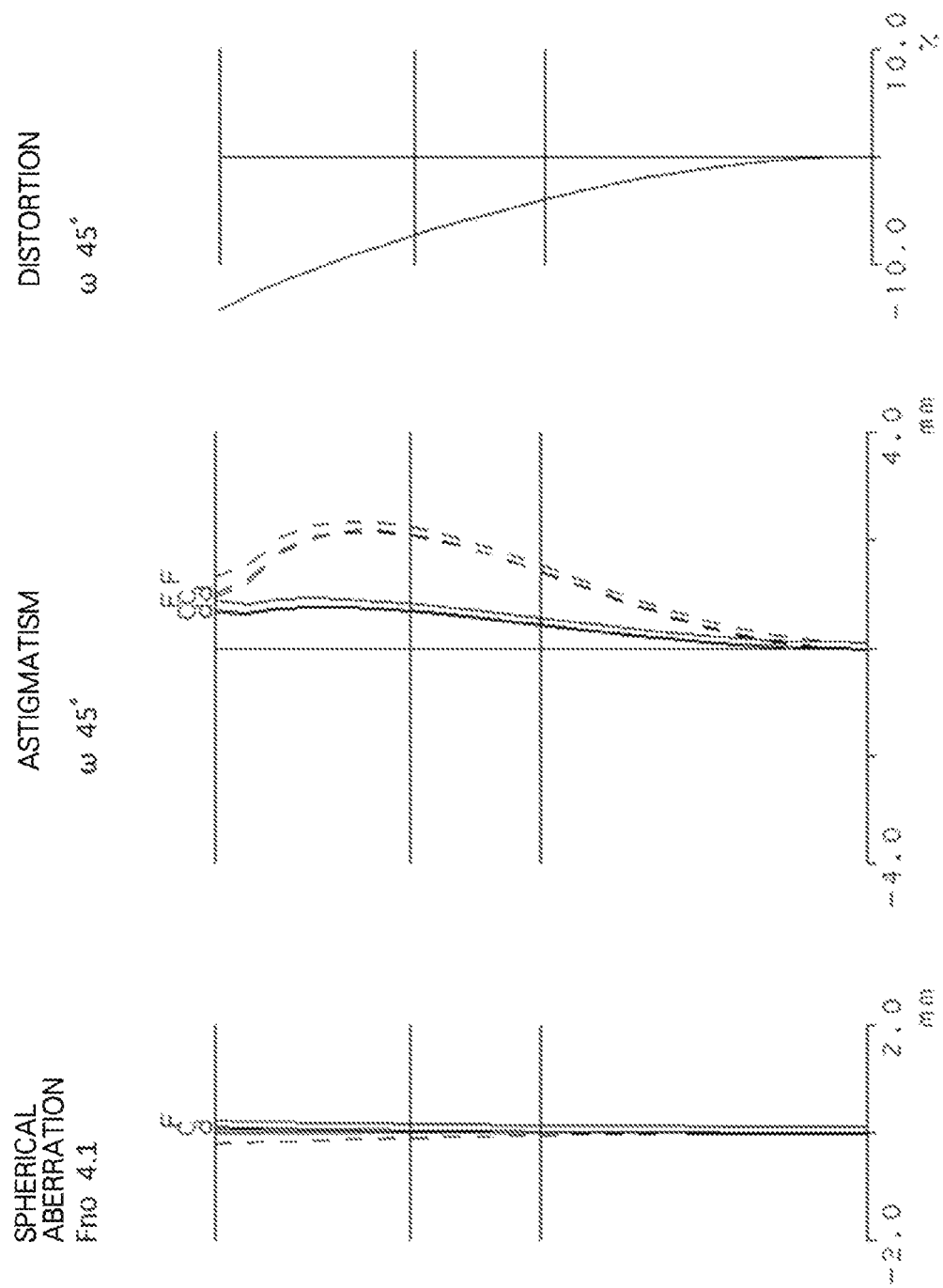
[FIG 18]

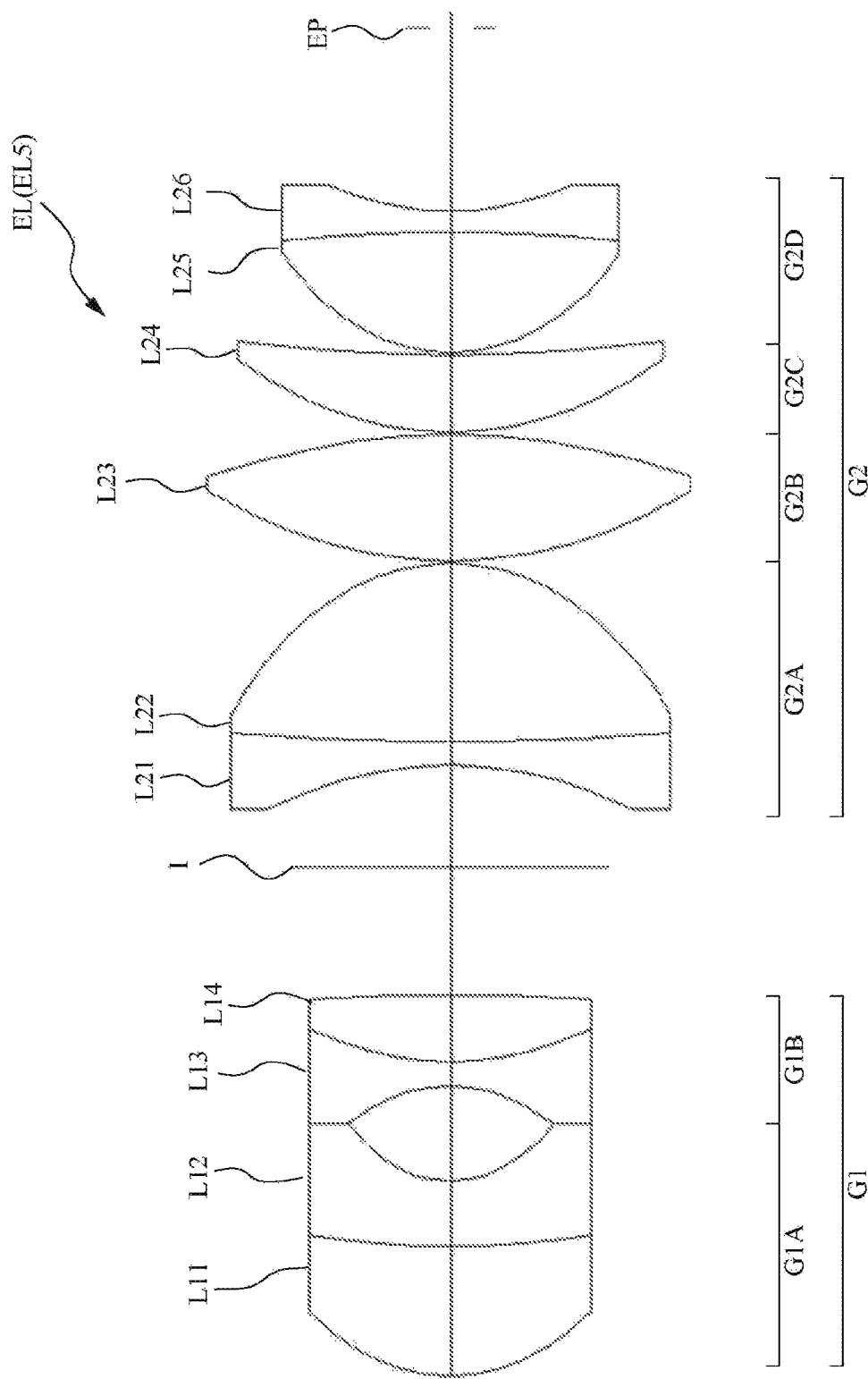
[FIG 19]

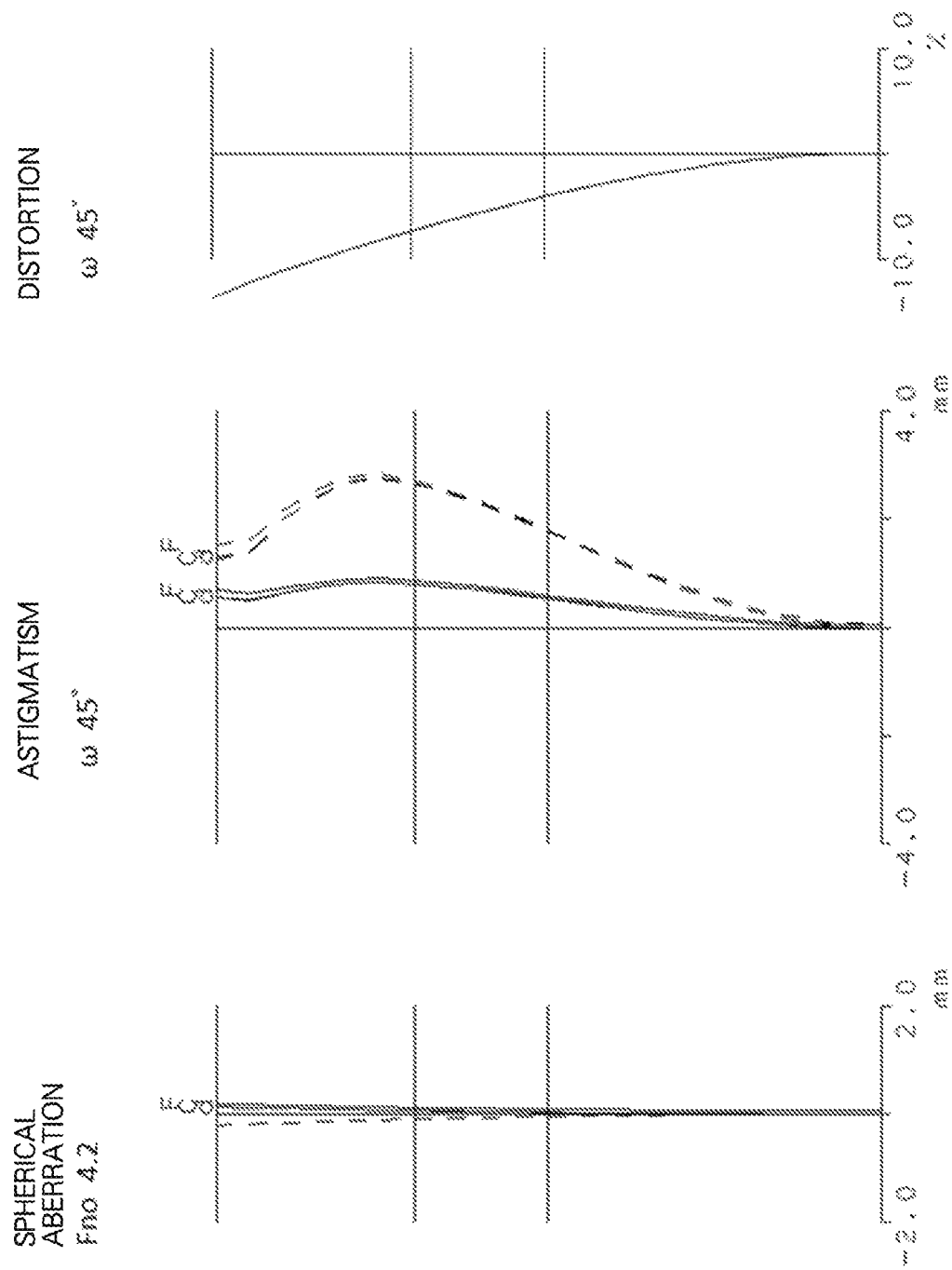
[FIG 20]

BINOCULARS AND OCULAR LENS

TECHNICAL FIELD

The present invention relates to binoculars and an ocular lens.

BACKGROUND ART

Binoculars (e.g., Patent Literature 1) adopting a Porro II prism as the arrangement of an erecting prism for downsizing have been known.

CITATION LIST

Patent Literature

[Patent Literature 1] Japanese Patent Laid-Open No. 11-064738

Bright binoculars having 7× magnification, a 50 mm objective lens aperture, about 7° to 7.50 real field of view, and a 7 mm exit pupil diameter, have been widely used as binoculars for security, marine purposes, and astronomical observation. The apparent field of view (apparent field of view=real field of view×magnification) of these binoculars is about 50°. There is a demand for wide angle binoculars having a 90 or larger real field of view and an apparent field of view larger than 70°. However, wide angle binoculars having a sharp field of view up to the periphery of the visual field require a large ocular lens and prism, which makes production difficult.

In particular, binoculars having a wide apparent field of view with a large exit pupil diameter requires an objective lens and an ocular lens with a larger aperture. Accordingly, the erecting prism corresponding to the objective lens and ocular lens becomes larger, whereby a lens-barrel is inevitably enlarged. Moreover, a larger ocular lens and erecting prism increase the interpupillary distance of the ocular lens.

SUMMARY OF INVENTION

Binoculars of a first aspect of the present invention includes an Abbe-Koenig prism which is an erecting optical element provided in a first lens-barrel and a second lens-barrel having an objective lens and an ocular lens, and the product of the effective diameter (mm) of the objective lens and the real field of view (°) is 450 mm° or larger.

An ocular lens of a second aspect of the present invention includes, from the object side in this order, a first lens group having negative refracting power, and a second lens group having positive refracting power. An object-side focal plane of the second lens group is positioned between the first lens group and the second lens group. The first lens group includes, from the object side in this order, a meniscus first A lens component whose convex surface is directed toward the object side, and a first B lens component having negative refracting power. The second lens group includes, in a position closest to the object side, a meniscus second A lens component whose concave surface is directed toward the object side. The condition of the following expression is satisfied:

$$1.8 \leq (-f1)/f \leq 6.0$$

$$0.5 \leq D/f \leq 2.0$$

where f is the entire focal length of the ocular lens, f1 is the focal length of the first lens group, and D is the air space between the first lens group and the second lens group.

Note that the summary of the invention does not list all characteristics of the present invention. Sub combinations of these characteristics are also included in the scope of the invention.

BRIEF DESCRIPTION OF DRAWINGS

FIG. 1 is an external perspective view of binoculars of the embodiment.

FIG. 2(*a*) is an external view of the binoculars of the embodiment as viewed from the rear.

FIG. 2(*b*) is a cross-sectional view of the binoculars of the embodiment taken along section A-A.

FIG. 3 is an enlarged view of an objective portion of the cross-sectional view of FIG. 2.

FIG. 4 is an external perspective view of an erecting prism unit of the binoculars of the embodiment.

FIG. 5 is an enlarged view of an ocular portion of the cross-sectional view of FIG. 2.

FIG. 6(*a*) is an external view of the binoculars of the embodiment as viewed from above.

FIG. 6(*b*) is a cross-sectional view of the binoculars of the embodiment taken along section B-B.

FIG. 7 is a diagram showing how the interpupillary distance of the binoculars of the embodiment is changed.

FIG. 8 is a diagram showing how the interpupillary distance of the binoculars of the embodiment is changed.

FIG. 9(*a*) is an external view of binoculars of another embodiment as viewed from above. FIG. 9(*b*) is an external view of the binoculars of the other embodiment as viewed from the rear.

FIG. 10 is a diagram showing how the interpupillary distance of the binoculars of the other embodiment is changed.

FIG. 11 is a lens configuration diagram of an ocular lens of a first example.

FIG. 12 shows aberration diagrams of the ocular lens of the first example.

FIG. 13 is a lens configuration diagram of an ocular lens of a second example.

FIG. 14 shows aberration diagrams of the ocular lens of the second example.

FIG. 15 is a lens configuration diagram of an ocular lens of a third example.

FIG. 16 shows aberration diagrams of the ocular lens of the third example.

FIG. 17 is a lens configuration diagram of an ocular lens of a fourth example.

FIG. 18 shows aberration diagrams of the ocular lens of the fourth example.

FIG. 19 is a lens configuration diagram of an ocular lens of a fifth example.

FIG. 20 shows aberration diagrams of the ocular lens of the fifth example.

DESCRIPTION OF EMBODIMENTS

Although the present invention will be described below by use of embodiments of the invention, the following embodiments are not intended to limit the invention of the scope of claims. Additionally, not all combinations of characteristics described in the embodiments are essential to the solving means of the invention.

FIG. 1 is an external perspective view of binoculars of the embodiment. For the sake of clarity of the description, directions will be defined according to the coordinate system shown in FIG. 1. In the coordinate system shown in FIG. 1, the positive direction on the x-axis is defined as "right," and the negative direction thereon is defined as "left." Similarly, the positive direction on the y-axis is defined as "up," and the negative direction thereon is defined as "down," while the positive direction on the z-axis is referred to as "rear," and the negative direction thereon is referred to as "front" in some cases.

Binoculars 10 include a right main body 26 and a left main body 36. In addition to the right main body 26 and the left main body 36, the binoculars 10 include a connection portion 40 that rotatably connects the right main body 26 and the left main body 36.

The right main body 26 includes a right objective portion 20, a right main body portion 22, and a right ocular portion 24. The left main body 36 includes a left objective portion 30, a left main body portion 32, and a left ocular portion 34.

The connection portion 40 rotatably connects the right main body 26 and the left main body 36, such that they are brought closer and separated relative to each other within a predetermined angle range. The right main body 26 and the left main body 36 rotate relative to each other around a rotation center axis 41 of the connection portion 40. Hence, the user can adjust the distance between the right ocular portion 24 and the left ocular portion 34 according to his/her interpupillary distance, that is, the pupillary distance.

FIG. 2(a) shows the binoculars 10 as viewed in a direction from the ocular portion toward the objective portion, that is, toward the negative direction on the z-axis shown in FIG. 1. FIG. 2(b) shows a cross-sectional view taken along section A-A shown in FIG. 2(a).

The internal structure of the binoculars 10 will be described with reference to FIG. 2(b). Note that in the embodiment, members of the right main body 26 and members of the left main body 36 have the same configuration and effects. Hence, for the sake of simplicity, in the following description, effects will be described by using the constituent members of the right main body 26 as a typical example.

The right objective portion 20 includes an objective lens group 101 and an objective lens-barrel 102 that stores the objective lens group 101. The objective lens group 101 is an imaging optical system that takes in light from an observation target in front of the binoculars 10, and forms an intermediate image inside the right main body 26.

The right main body portion 22 includes an erecting prism 110 and a main body lens-barrel 116 that stores the erecting prism 110. The erecting prism 110 is made up of an auxiliary prism 111 and a roof prism 112. The erecting prism 110 is an erecting optical system that erects the inverted intermediate image of the observation target formed by the objective lens group 101. In the embodiment, an Abbe-Koenig prism is used as an example of the erecting prism 110. The erecting prism 110 is held by a prism holding portion 114, and is fixed to the main body lens-barrel 116.

Main forms of the erecting prism of binoculars include a Porro I prism, a Porro II prism, a Schmidt-Pechan prism, and an Abbe-Koenig prism. Other various prism forms have also been known. The larger the effective diameter of the prism, the larger the prism, and the longer the optical path length. Of the above forms, in Porro I and II prisms, an oblique light flux from a wide end of view of the real field of view is not reflected totally, unless a high refractive index glass material is used. A Schmidt-Pechan prism has a reflective surface that does not reflect light totally. Meanwhile, in an Abbe-Koenig prism, an oblique light flux from an end of view is reflected totally, and even a prism with a large effective diameter can be stored in a hand-holdable lens-barrel having a relatively small diameter. Hence, an Abbe-Koenig prism is used as the erecting prism 110 of the binoculars 10 of the embodiment.

The right ocular portion 24 includes an ocular lens group 121, a front ocular lens holding frame 124, and a rear ocular lens holding frame 125. The ocular lens group 121 has a front ocular lens group 122 and a rear ocular lens group 123. The ocular lens group 121 is an observation optical system for magnifying the erected intermediate image of the observation target formed by the objective lens group 101 and the erecting prism 110. In the embodiment, the objective lens group 101 and the ocular lens group 121 function as a telescopic optical system.

In FIG. 2(b), a path of a ray passing through an optical axis 27 of the objective lens group 101, and an optical axis 28 of the front ocular lens group 122 and the rear ocular lens group 123 is indicated by alternate long and short dashed lines. Light from the observation target in front of the binoculars 10 is collected by the objective lens group 101, and enters the auxiliary prism 111. Note that in the following description, light from an observation target is sometimes referred to as observation light.

The observation light having entered the auxiliary prism 111 is reflected on total reflection surfaces of the auxiliary prism 111, and enters the roof prism 112. The observation light having entered the roof prism 112 is reflected on a pair of roof surfaces and total reflection surfaces, and enters the ocular lens group 121. The inverted image formed by the objective lens group 101 is converted into an erected image by being reflected on the reflective surfaces of the auxiliary prism 111 and the roof prism 112.

In FIG. 2(b), the objective lens-side optical axis and the ocular lens-side optical axis of the Abbe-Koenig erecting prism are decentered. The right and left optical axes on the objective lens side are preferably arranged as far away in the decentering direction as possible, to increase three-dimensional appearance of the field of view of the binoculars, and also to avoid interference between metal frames of the right and left objective lenses even with large-aperture objective lenses. That is, an edge line 113 of the right roof prism 112 and an edge line 213 of a left roof prism 212 are arranged so as to face each other.

The ocular lens group 121 guides the incident observation light to an eye point which is an exit pupil behind the ocular lens group 121. The user can observe the observation image by placing his/her pupil in the eye point.

The performance of binoculars is mainly defined by the size of the field of view (real field of view), the effective diameter of the objective lens (entrance pupil diameter), and magnification. Additionally, the apparent field of view expressed by an angle formed by the light flux entering the eye from the ocular lens is generally determined by real field of view×magnification. Moreover, the size of an erecting prism used in binoculars depends on the aperture ratio of the objective lens and configuration of the ocular lens, but is generally proportional to the product of the effective diameter of the objective lens (entrance pupil diameter) and the real field of view. In binoculars having a 9° or larger real field of view, the product of the effective diameter (mm) of the objective lens and the real field of view (°) is 400 or larger.

In order to guide a light flux from such an objective lens to the eyes of an observer by making full use of the performance of an ocular lens, such as a later-mentioned ocular lens, that forms an image sharply up to the periphery of the visual field, has a long eye relief, and has a wide apparent field of view, the effective diameter of an ocular lens-side aperture of the erecting prism is preferably 28 mm or larger.

Note that the binoculars 10 of the embodiment has a 10.7° real field of view, a 50 mm aperture of the objective lens groups 101 and 201, and a 7 mm exit pupil diameter. In addition, the effective diameter of the ocular lens-side aperture of the roof prisms 112 and 212 is 32 mm.

FIG. 3 is an enlarged view of the objective portion of the cross-sectional view of FIG. 2. In particular, FIG. 3 shows an enlarged view of the vicinity of the objective lens group 101 in the right objective portion 20. Note that since the right objective portion 20 and the left objective portion 30 have the same configuration and effects in the embodiment, the right objective portion 20 will be described as a typical example.

The right objective portion 20 has a decentering ring 103 which is an adjustment member for adjusting the optical axis of the telescopic optical system relative to the erecting prism 110. The right objective portion 20 also has an objective lens holding frame 104.

The decentering ring 103 fits with the inner diameter of the objective lens-barrel 102. The inner diameter of the decentering ring 103 fits with the outer diameter of the objective lens holding frame 104. The objective lens holding frame 104 holds the objective lens group 101.

In the decentering ring 103, the center axis of the outer diameter and the center axis of the inner diameter are decentered. Also, the outer diameter of the objective lens holding frame 104 on which the decentering ring 103 fits and the optical axis of the objective lens group 101 are decentered. Hence, by rotating the decentering ring 103 and the objective lens holding frame 104 relative to the objective lens-barrel 102, the optical axis of the objective lens group 101 can be decentered with respect to the objective lens-barrel 102. With this operation, the optical axes of the right and left lens-barrels can be adjusted parallel to the rotation center axis 41, so that discomfort due to displacement between the right and left observation images does not occur.

FIG. 4 is an external perspective view of an erecting prism unit of the binoculars of the embodiment.

The auxiliary prism 111 and the roof prism 112 are combined and held in the prism holding portion 114.

The prism holding portion 114 has a plate member 119a and a plate member 119b. The plate member 119a is screwed to the prism holding portion 114 while pressing one end of the roof prism 112 on the roof surface side on the ocular lens side, and thereby fixes the roof prism 112 to the prism holding portion 114. The plate member 119b is screwed to the prism holding portion 114 while pressing surfaces facing total reflection surfaces of the auxiliary prism 111, and thereby fixes the auxiliary prism 111 to the prism holding portion 114. Hence, the prisms having large mass can be kept from being displaced even when an impact of a certain intensity or stronger is applied to the binoculars. Moreover, side surfaces of the roof prism 112 and the auxiliary prism 111 are preferably adhered and fixed to the prism holding portion 114. In this case, the prism and the prism holding frame are adhered by filling five holes provided in each of two side surfaces of the prism holding portion 114 with an adhesive agent, and hardening the adhesive agent. The roof prism 112 has a roof surface 117 and a roof surface 118 which are a pair of roof surfaces. The roof surface 117 and the roof surface 118 are arranged orthogonal to each other to form a roof edge 113.

The plate member 119b has, in a position of an end portion of the roof edge 113 on the auxiliary prism 111 side, a prism protection portion 115 as a protection member for protecting the end portion. The tip end of the prism protection portion 115 may be separated from or in contact with an inner wall of the main body portion.

The erecting prism unit of the embodiment shown in FIG. 4 is symmetrical with respect to a bisecting plane of a dihedral angle formed of the roof surface 117 and the roof surface 118. That is, erecting prism units having the same shape are used for the right main body 26 and the left main body 36.

FIG. 5 is an enlarged view of the ocular portion of the cross-sectional view of FIG. 2.

The right ocular portion 24 also has the front ocular lens holding frame 124 and the rear ocular lens holding frame 125. Similarly, the left ocular portion 34 also has a front ocular lens holding frame 224 and a rear ocular lens holding frame 225. The front ocular lens group 121 is held by the front ocular lens holding frame 124. The rear ocular lens group 122 is held by the rear ocular lens holding frame 125. The rear ocular lens holding frame 125 is fixed to the front ocular lens holding frame 124. Similarly, the front ocular lens group 221 is held by the front ocular lens holding frame 224, and the rear ocular lens group 222 is held by the rear ocular lens holding frame 225, while the rear ocular lens holding frame 225 is fixed to the front ocular lens holding frame 224.

The right ocular portion 24 also has a connecting ring 126 and an operation ring 128. Similarly, the left ocular portion 34 also has a connecting ring 226 and an operation ring 228. The connecting ring 126 connects the operation ring 128 and the front ocular lens holding frame 124 in a relatively rotatable manner.

In the embodiment, the right ocular portion 24 is configured such that rotation of the operation ring 128 moves the front ocular lens holding frame 124 in the direction of the optical axis 28, through the connecting ring 126. The left ocular portion 34 is configured such that rotation of the operation ring 228 moves the front ocular lens holding frame 224 in the direction of an optical axis 38, through the connecting ring 226. FIG. 5 shows a specific configuration. The right ocular portion 24 has an index ring 132 and a scale ring 134, in addition to the operation ring 128, the connecting ring 126, and the front ocular lens holding frame 124. The left ocular portion 34 has an index ring 232 and a scale ring 234, in addition to the operation ring 228, the connecting ring 226, and the front ocular lens holding frame 224. Note that since the right ocular portion 24 and the left ocular portion 34 have the same configuration, constituent members and effects of the right ocular portion 24 will be described as a typical example.

The cylindrical connecting ring 126 has a protrusion 126a on the inner diameter side thereof, and the front ocular lens holding frame 124 has, on the outer diameter side thereof, a groove 124a into which the protrusion 126a fits. The front ocular lens holding frame 124 has, on the outer diameter side thereof, a groove 124b extending in the direction of the optical axis of the ocular lens group 121. The connecting ring 126 is fixed to the operation ring 128 with a screw 129a. The scale ring 134 is fixed to the operation ring 128 with a screw 129b.

The index ring 132 has a thread 132a on an outer circumferential portion thereof. Meanwhile, the operation ring 128 has, on an inner circumferential portion thereof, a thread 128a that meshes with the thread 132a of the index ring 132. The index ring 132 has index lines (not shown) engraved on the outer circumference thereof, and the scale ring 134 has scales (not shown) on the outer circumference thereof. The absolute position of the operation ring 128 can be checked by using the scale of the scale ring 134 and the index lines of the index ring 132 that rotate along with rotation of the operation ring 128.

A restriction screw 136 is planted in a fitting portion of the index ring 132 with the front ocular lens holding frame 124, and has a protrusion 136a that protrudes to the fitting portion of the index ring 132 with the front ocular lens holding frame 124. The front ocular lens holding frame 124 has, in a fitting portion with the index ring 132, the groove 124b extending in the direction of the optical axis of the ocular lens group 121. The protrusion 136a of the restriction screw 136 fits into the groove 124b. Accordingly, along with rotation of the operation ring 128, the front ocular lens holding frame 124 moves along the optical axis 28 of the ocular lens group 121, instead of rotating around the optical axis 28 of the ocular lens group 121.

Along with rotation of the operation ring 128, the connecting ring 126 rotates around the optical axis but does not move in the direction of the optical axis of the ocular lens group 121 due to the protrusion 126a of the connecting ring 126 fitted into the groove 124b of the front ocular lens holding frame 124. Meanwhile, along with rotation of the operation ring 128, the thread 128a rotates to move the front ocular lens holding frame 124 in the direction parallel to the optical axis 28 of the ocular lens group 121.

Accordingly, the user can rotate the operation ring 128 to integrally move the front ocular lens group 121 and the rear ocular lens group 122 in the direction of the optical axis 28 and adjust the focus.

As mentioned earlier, the diameter of the ocular lens needs to be enlarged to obtain binoculars with a large apparent field of view. To achieve a large apparent field of view, the binoculars 10 of the embodiment has an ocular lens with a relatively large aperture. When the connecting ring 126 is an integral annular member, the connecting ring 126 is attached from the rear of the ocular lens. In this case, the inner diameter of the connecting ring 126 is larger than at least the outer diameters of the front ocular lens holding frame 124 and the rear ocular lens holding frame 125, and therefore the outer diameter of the right ocular portion 24 is enlarged.

In the embodiment, the connecting ring 126 is cylindrical, and is a member that is splittable in the radial direction. Hence, at the time of assembly, split parts of the connecting ring 126 may be fit from the outer diameter side of the front ocular lens holding frame 124. For this reason, the inner diameter of the connecting ring 126 may be determined according to the diameter of the attachment position, irrespective of the outer diameters of the front ocular lens holding frame 124 and the rear ocular lens holding frame 125.

Accordingly, the inner diameter of the connecting ring 126 can be made smaller than when an inseparable member is used, so that the focusing mechanism may be configured as large as possible to the limit of the minimum interpupillary distance, without enlarging the outer diameter of the right ocular portion 24.

FIG. 5(a) shows the right ocular portion 24 when an eye cup 127 is twisted out. FIG. 5(c) shows positions of a click hole row 127b and a cam groove 127a when the eye cup 127 is twisted out. The cam groove 127a, the click hole row 127b, a guide pin (not shown), a ball 137, and a coil spring 138 are provided in three points at 120° intervals in the radial direction. The eye cup 127 of the embodiment is made of an elastic member. Additionally, the eye cup 127 has a truncated cone shape whose diameter reduces toward the rear. Hence, the eye cup 127 of the right ocular portion 24 does not come into contact with the nose of the user during use of the binoculars 10.

The maximum outer diameter of the right ocular portion 24 and the left ocular portion 34 is limited by the human interpupillary distance. The maximum outer diameter of the right ocular portion 24 and the left ocular portion 34 should be set so that the right ocular portion 24 and the left ocular portion 34 do not interfere with each other at the minimum interpupillary distance of the binoculars. Thus, the space for providing the eye cup twist-out structure is limited. Structures for twisting out the eye cup and fixing the position of the eye cup are formed between the outer diameter of the rear ocular lens group 123 and the outer diameter of the right ocular portion 24. Specifically, provided are the coil spring 138 and the ball 137 for fixing the position, a click hole row 127b into which the ball 137 fits, the cam groove 127a for twisting to the front and rear, and the guide pin fit into the groove. The click hole row 127b into which the ball 137 fits is provided on the inner diameter side of a tube including the cam groove 127a, while holes for accommodating the coil spring 138 and the ball 137 are formed in a thick portion of the rear ocular lens holding frame 125 on the eye cup 127 side. Such a structure may be formed by making the outer diameter of the rear lens group of the rear ocular lens group 123 smaller than the outer diameter of the front lens group thereof. Note that the click hole row 127b may be substituted with a circumferentially-extending click groove.

FIG. 5(b) shows the right ocular portion 24 when the eye cup 127 is stored. FIG. 5(d) shows positions of the click hole row 127b and the cam groove 127a when the eye cup 127 is stored.

FIG. 6(a) shows the binoculars 10 as viewed from above. FIG. 6(b) shows a cross-sectional view taken along section B-B of FIG. 6(a).

The erecting prism units described with reference to FIG. 4 are accommodated in the right main body portion 22 and the left main body portion 32, such that the right roof edge 113 and a left roof edge 213 substantially face each other in the state shown in FIG. 6(b). The right erecting prism 110 is fixed to the right main body portion 22 by three fixing portions 140a, 140b, and 140c provided inside the right main body portion 22, through the prism holding portion 114. Similarly, a left erecting prism 210 is fixed to the left main body portion 32 by three fixing portions 240a, 240b, and 240c provided inside the left main body portion 32, through a prism holding portion 214. Note that although the three fixing portions 140a, 140b, and 140c are on the same plane as the fixing portions 240a, 240b, and 240c in the example, other configurations may be adopted in practice.

Arrow 51 and arrow 52 respectively indicate the rotating direction of the right main body portion 22 and the left main body portion 32. The right main body portion 22 and the left main body portion 32 respectively rotate in the direction of arrow 51 and arrow 52 around the rotation center axis 41 of the connection portion 40. With this rotation, the distance between the optical axis 28 of the right ocular lens group 121 and the optical axis 38 of the left ocular lens group 221 may be varied to change the interpupillary distance. Note that a standard human interpupillary distance of an adult is approximately 64 mm, and in normal binoculars, the distance between the optical axes of ocular lenses is preferably variable between about 58 mm and 72 mm inclusive, taking into account the individual differences of human interpupillary distance.

FIG. 7 is a diagram showing how the interpupillary distance of the binoculars of the embodiment is changed. In particular, FIG. 7 shows cross-sectional views taken along section B-B shown in FIG. 6(a), in each of states where the interpupillary distance is adjusted to three different interpupillary distances. FIG. 8 shows the dimensions of when the internal erecting prism alone is taken out and placed.

FIG. 7 shows an ocular lens aperture 130 and an ocular lens aperture 230 indicating the positions of apertures of the right and left ocular lens groups. FIG. 7 also shows a bisecting plane of a dihedral angle formed of the right roof surface 117 and roof surface 118, a bisector 29 formed by section B-B, a bisecting plane of a dihedral angle formed of a left roof surface 217 and roof surface 218, and a bisector 39 formed by section B-B. Additionally, FIG. 7 shows an intersection 42 which is an intersection between the bisector 29 and the bisector 39. FIG. 8 shows specific positions of ocular lens-side apertures 151, 251 of the roof prisms in the ocular lens aperture of FIG. 7, and the roof prisms.

Of the right main body portion 22, an outer wall surface 120 near the roof surface 117 is substantially parallel to the roof surface 117. Similarly, of the left main body portion 32, an outer wall surface 220 near the roof surface 217 is substantially parallel to the roof surface 217. Here, substantially parallel means that the two surfaces substantially face each other.

As described with reference to FIG. 6, the right main body portion 22 and the left main body portion 32 rotate within a predetermined angle range around the rotation center axis 41 of the connection portion 40 located above the intersection 42 in the drawing, that is, a certain angle range in which the interpupillary distance may be set to a width at least including 64 mm, preferably an angle range in which the interpupillary distance may be set to a width of 58 mm to 72 mm, and more preferably an angle range in which the interpupillary distance may be set to a width of 56 mm to 76 mm.

Here, angle refers to an angle formed of the right bisector 29 and the left bisector 39. In this example, the distance between the rotation center axis 41 and the center of the ocular lens aperture is about 50 mm, and the angle formed of the bisector 29 and the bisector 39 is rotatable within the angle range of 137° to 108°.

In the state shown in FIG. 7(a) and FIG. 8(a), angle θ1 formed of the right bisector 29 and the left bisector 39 of the ocular lens aperture is 137 degrees which is the maximum value of the predetermined angle range. At this time, the right ocular lens aperture 130 and the left ocular lens aperture 230 are farthest apart, and interpupillary distance D1 which is the center to center distance is 76 mm. When the effective diameter of the ocular lens-side aperture of the Abbe-Koenig prism is 32 mm, the maximum distance between edge line ends 113a and 213a of the roof prism is 31 mm, and the minimum distance thereof is 18 mm. When the effective diameter of the ocular lens-side aperture of the Abbe-Koenig prism is 28 mm, the maximum distance between edge line ends 113a and 213a of the roof prism is 36 mm. Note that although the outside of the effective diameter of the roof prism end is chamfered in the prisms illustrated in FIGS. 2 and 4, the dimensions of the edge line shown in FIG. 8 are dimensions of the edge line ends when they are not chamfered.

In the state shown in FIG. 7(b) and FIG. 8(b), angle θ2 formed of the right bisector 29 and the left bisector 39 is about 117 degrees. At this time, interpupillary distance D2 which is the center to center distance of the ocular lens apertures of the right ocular lens aperture 130 and the left ocular lens aperture 230 is 64 mm. As compared to FIG. 7(a), the right roof surface 117 and the left roof surface 217 are brought closer to each other, and are closer to being parallel to each other in the direction of the optical axis. When the effective diameter of the ocular lens-side aperture of the Abbe-Koenig prism is 32 mm, the maximum distance between edge line ends 113a and 213a of the roof prism is 23 mm, and the minimum distance thereof is 11 mm. When the effective diameter of the ocular lens-side aperture of the Abbe-Koenig prism is 28 mm, the maximum distance between edge line ends 113a and 213a of the roof prism is 28 mm.

In the state shown in FIG. 7(c) and FIG. 8(c), angle θ3 formed of the right bisector 29 and the left bisector 39 is 108 degrees which is the minimum value of the predetermined angle range. At this time, the right ocular lens aperture 130 and the left ocular lens aperture 230 are brought closest to each other, and interpupillary distance D3 which is the center to center distance of the ocular lens apertures is 58 mm. In this state, the distance between the centers of the right and left objective lenses also becomes the smallest. In the example, this distance is about 75 mm. As compared to FIG. 7(b), the right roof surface 117 and the left roof surface 217 are brought closer to each other, and are closer to being parallel to each other in the direction of the optical axis. When the effective diameter of the ocular lens-side aperture of the Abbe-Koenig prism is 32 mm, the maximum distance between edge line ends 113a and 213a of the roof prism is 19 mm, and the minimum distance thereof is 8 mm. When the effective diameter of the ocular lens-side aperture of the Abbe-Koenig prism is 28 mm, the maximum distance between edge line ends 113a and 213a of the roof prism is 24 mm. Note that in the embodiment, the rotation range of the right main body portion 22 and the left main body portion 32 is restricted by the outer wall surfaces 220 and 120 of the main body. The rotation range may be restricted by the connection portion 40.

As described with reference to parts (a) to (c) of FIG. 7 and parts (a) to (c) of FIG. 8, by reducing the distance between the edge line ends 213a and 113a of the right and left erecting prisms having a large effective diameter of ocular lens-side apertures, the roof surface 117 of the right roof prism 112 and the roof surface 217 of the left roof prism 212 are arranged inside the right main body portion 22 and the left main body portion 32, such that the closer the right main body portion 22 and the left main body portion 32 are brought to each other, the closer the roof surface 117 and the roof surface 217 are brought to being parallel to each other. Then, when the right main body portion 22 and the left main body portion 32 are brought closest to each other, the roof surface 117 and the roof surface 217 are substantially parallel to each other in the direction of the optical axis. By arranging the right erecting prism 110 and the left erecting prism 210 as in the embodiment, the configuration of the binoculars 10 can be downsized, three-dimensional appearance can be ensured by maximizing the distance between objective lenses, and a configuration applicable to a larger aperture objective lens can be achieved.

FIGS. 9 and 10 show another embodiment of the binoculars 10. FIG. 9(a) is an external view of the binoculars of the other embodiment as viewed from above, and FIG. 9(b) is an external view of the binoculars of the other embodiment as viewed from the rear. FIG. 10 shows a cross-sectional view taken along section C-C shown in FIG. 9(a). In the example, a right main body 26 and a left main body 36 are connected in a horizontally slidable manner. As shown in FIG. 9, a sliding mechanism 300 is made up of two cylinder fitting portions 304 and 305. The first cylinder fitting portion 304 is provided with a screw 302 and a drop prevention collar 303. By rotating a knob 301, the distance between right and left lens-barrels vary, and the interpupillary distance can be adjusted. The second cylinder fitting portion 305 assists the sliding movement of the first cylinder fitting portion 304, while preventing rotation of the right and left lens-barrels in a direction perpendicular to the optical axis. FIG. 10 shows cross-sectional views of a prism portion when the interpupillary distance is varied to 76 mm, 64 mm, and 58 mm. Note that in FIG. 10, the arrangement angle of the right and left Abbe-Koenig prisms is the same as the arrangement angle in FIG. 8(c), and an angle formed of a bisector 29 of a section perpendicular to the optical axis of the right roof prism and a bisector 39 of a section perpendicular to the optical axis of the left roof prism is 108 degrees.

As mentioned earlier, the performance of binoculars is mainly defined by the size of the field of view (real field of view), the effective diameter of the objective lens (entrance pupil), and magnification. Additionally, the size of an erecting prism used in binoculars is generally proportional to the product of the effective diameter of the objective lens (entrance pupil diameter) and the real field of view. Here, when the objective lens effective diameter is D, the real field of view is $\theta$, the F value is Fno, and the focal length is f, an image height y is expressed by $y=f \times \tan \theta = Fno \times D \times \tan \theta$. That is, the product of the effective diameter of the objective lens and the real field of view is an index of the image height y. The F value of binoculars is normally about 3.5 to 4. In binoculars with a 50 mm object lens aperture and a 9° or larger real field or view, the product of the effective diameter of the object lens and the real field of view is 450 or larger. For example, when the product of the effective diameter of the objective lens and the real field of view is 450 and the F value of the objective lens is 3.5, the image height of an image formed by the objective lens is about 28 mm.

In the embodiment, in order to form an erected image with the Abbe-Koenig prism by allowing entrance of a light flux exceeding an image height of 28 mm while preventing enlargement of the binoculars, the prism is separated by a predetermined distance from the objective lens as shown in FIG. 2. Moreover, to avoid excessive extension of the total length of the binoculars, the arrangement angle of the roof prism and auxiliary prism of the Abbe-Koenig prism is set so that the right and left roof edge lines form a large angle of about 5$\theta$ to 10$\theta$ with respect to the optical axis. In the embodiment, the angle of the right and left roof edge lines with respect to the optical axis is 7.5°. The example adopts such a prism, and when the interpupillary distance is set to a normal value of 64 mm, the maximum distance between edge lines of the roof prisms forming the Abbe-Koenig prism is set to be 28 mm or smaller.

Thus, by setting the maximum distance between edge lines of the Abbe-Koenig prism to be 28 mm or smaller, the binoculars can be configured compactly without being enlarged, even with binoculars having extremely large real field of view of 9° or larger. In particular, an ocular optical system having a large field of view of a 9° or larger real field of view and an apparent field of view larger than 70°, and having a long eye relief tends to be large in both diameter and total length. Hence, by adopting the above configuration of the Abbe-Koenig prism, the overall size of the binoculars can be suppressed. Hence, it is possible to provide binoculars having an extremely large real field of view of 9° or larger, and capable of forming a sharp image up to the periphery of the visual field, while being compact in size.

Additionally, as mentioned earlier, when the product of the effective diameter of the objective lens and the real field of view is 450 and the F value of the objective lens is 3.5, the image height of an image formed by the objective lens is about 28 mm. In the embodiment, the ocular lens-side effective diameter of the roof prism arranged on the ocular lens side of the Abbe-Koenig prism is larger than the image height of the image formed by the objective lens. Accordingly, the effective diameter of the ocular lens-side aperture of the roof prism arranged on the ocular lens side of the Abbe-Koenig prism which is the erecting prism 110 is at least φ28 or larger. With this configuration, even with binoculars having an extremely large real field of view of 9° or larger due to a later-mentioned ocular lens, an observation image can be formed sharply up to the periphery of the visual field.

Note that although the embodiment uses an example where the effective diameter of the objective lens is 50 mm, the product of the objective lens effective diameter and the real field of view is also 450 in a case of binoculars having a 45 mm objective lens aperture and a 10° real field of view, or binoculars having a 40 mm objective lens aperture and a 11.25° real field of view, for example. In these forms or any other form, when the product of the effective diameter of the object lens and the real field of view is 450 or larger, the image height of an image formed by the objective lens is 28 mm or larger.

Accordingly, when the interpupillary distance is set to a normal value of 64 mm, by setting the distance between edge lines of the right and left roof prisms forming an Abbe-Koenig prism to be 28 mm or smaller, the binoculars can be formed compactly without being enlarged, even with an extremely large real field of view of 9° or larger.

Moreover, by setting the effective diameter of the ocular lens-side aperture of the roof prism arranged on the ocular lens side of the Abbe-Koenig prism to be 28 mm or larger, it is possible to provide binoculars having an extremely large real field of view of 9° or larger, and capable of forming a sharp image up to the periphery of the visual field, while being compact in size.

Additionally, when an end portion of a roof prism of an Abbe-Koenig prism is chamfered, the distance between apexes of edge line ends closest to the ocular lens of the roof prisms forming the right and left Abbe-Koenig prisms, refers to a distance between intersections where a plane including an end face on the ocular side perpendicular to the optical axis of the roof prism and a roof edge line intersect.

As has been described, the binoculars 10 of the embodiment are configured such that when the product of the effective diameter of the objective lens and the real field of view is 450 or larger, and the distance between the exit optical axis to the right and left ocular lens side is adjusted to 64 mm, the distance between apexes of edge line ends 213a and 113a closest to the ocular lens of the roof prisms 212 and 112 forming the erecting prism 210 and 110 which are the right and left Abbe-Koenig prisms is 28 mm or smaller at a maximum.

Next, the ocular lens used in the binoculars of the embodiment will be described with reference to FIGS. 11 to 20. Note that the ocular lens described below is applicable not only to the aforementioned binoculars, but can also be combined with an objective lens system without an erecting prism such as an astronomical telescope, and other types of erecting prisms.

As shown in FIG. 11, an ocular lens EL of the embodiment includes, from an object side in this order, a first lens group G1 having negative refracting power, and a second lens group G2 having positive refracting power. In the ocular lens EL, an object-side focal plane I of the second lens group G2 is positioned between the first lens group G1 and the second lens group G2. Additionally, the first lens group G1 includes, from the object side in this order, a meniscus first A lens component G1A whose convex surface is directed toward the object side, and a first B lens component G1B having negative refracting power. The second lens group G2 includes, on the side closest to the object, a meniscus second A lens component whose concave surface is directed toward the object side. Note that "lens component" refers to a single lens or a cemented lens.

The ocular lens EL of the embodiment preferably satisfies the following conditional expression (1)

$$1.8 \leq (-f1)/f \leq 6.0 \tag{1}$$

where f: focal length of entire ocular lens EL f1: focal length of first lens group G1

The conditional expression (1) defines a ratio between a focal length f1 of the first lens group G1 and a focal length f of the entire ocular lens EL. When the result exceeds an upper limit value of the conditional expression (1), it is undesirable since the Petzval sum of the ocular lens EL increases and the curvature of field and astigmatism cannot be corrected sufficiently. Note that to ensure the effect of the conditional expression (1), the upper limit value of the conditional expression (1) is preferably set to 5.0. Conversely, when the result falls below a lower limit value of the conditional expression (1), it is undesirable since the divergence effect in the first lens group G1 becomes too intense, and increases the lens diameter of the second lens group G2. Note that to ensure the effect of the conditional expression (1), the lower limit value of the conditional expression (1) is preferably set to 2.2.

Additionally, the ocular lens EL of the embodiment preferably satisfies the following conditional expression (2).

$$0.5 \leq D/F \leq 2.0 \tag{2}$$

where f: focal length of entire ocular lens EL

D: air space between first lens group G1 and second lens group G2

The conditional expression (2) defines an on-axis air spaceair space between the first lens group G1 and the second lens group G2. By satisfying the conditional expression (2), a more compact optical system can be achieved. When the result falls below a lower limit value of the conditional expression (2), the air space between the first lens group G1 and the second lens group G2 is narrowed and the lens groups come closer to the image plane, which is undesirable since dust or damage on the lens surface becomes visible with the observation image. Note that to ensure the effect of the conditional expression (2), the lower limit value of the conditional expression (2) is preferably set to 0.6, and more preferably to 0.7. When the result exceeds an upper limit value of the conditional expression (2), it is undesirable since the total length becomes long and the lens diameter of the second lens group G2 increases, whereby the configuration becomes less compact. Note that to ensure the effect of the conditional expression (2), the upper limit value of the conditional expression (2) is preferably set to 1.5, and more preferably to 1.2.

Additionally, the ocular lens EL of the embodiment preferably satisfies the following conditional expression (3).

$$0.5 \leq G1Arf/f \leq 2.0 \tag{3}$$

where f: focal length of entire ocular lens EL

G1Arf: radius of curvature of lens surface of first A lens component G1A closest to object side The conditional expression (3) defines a ratio between a radius of curvature G1Arf of a lens surface closest to the object side of the first lens component G1A constituting the first lens group G1, and the entire focal length f. By satisfying the conditional expression (3), the height from the optical axis of the light flux in the periphery of the visual field incident on the ocular lens EL can be lowered, and an increase in the diameter of following lens can be suppressed. When the result falls below a lower limit value of the conditional expression (3), it is undesirable since a refractive effect on the lens surface closest to the object side of the first lens component G1A becomes excessively large, and deteriorates aberration in the periphery of the visual field. Note that to ensure the effect of the conditional expression (3), the lower limit value of the conditional expression (3) is preferably set to 0.7, and more preferably to 08. Conversely, when the result exceeds an upper limit value of the conditional expression (3), it is undesirable since the refractive effect on the lens surface closest to the object side of the first lens component G1A becomes insufficient, the effect of lowering the light flux is deteriorated, and the diameter of following lens is increased. Note that to ensure the effect of the conditional expression (3), the upper limit value of the conditional expression (3) is preferably set to 1.7, and more preferably to 1.4.

Additionally, the ocular lens EL of the embodiment preferably satisfies the following conditional expression (4).

$$1.0 \leq G1Arf/G1Arr \leq 10.0 \tag{4}$$

where

G1Arf: radius of curvature of lens surface of first A lens component G1A closest to object side G1Arr: radius of curvature of lens surface of first A lens component G1A closest to eye side The conditional expression (4) defines a ratio between a radius of curvature G1Arf of a lens surface closest to the object side of the first lens component G1A, and a radius of curvature G1Arr of a lens surface closest to the eye side. By satisfying the aforementioned conditional expression (3) and the conditional expression (4), the first A lens component G1A may be formed into a meniscus shape directing a strong convex surface toward the object side and a strong concave surface toward the eye side, a Galilean system effective in reducing the Petzval sum can be formed, which is effective in correcting the field curvature and astigmatism. When the result falls below a lower limit value of the conditional expression (4), it is undesirable since the first A lens component G1A acts in a direction of increasing the positive refracting power, whereby the Petzval sum is increased. Note that to ensure the effect of the conditional expression (4), the lower limit value of the conditional expression (4) is preferably set to 1.2, and more preferably to 1.3. Conversely, when the result exceeds an upper limit value of the conditional expression (4), it is undesirable since the negative refractive effect of the lens surface on the eye side of the first A lens component G1A becomes excessively large, and causes a sudden deterioration in aberration in the periphery of the visual field. Note that to ensure the effect of the conditional expression (4), the upper limit value of the conditional expression (4) is preferably set to 5.0, and more preferably to 2.0.

Additionally, the ocular lens EL of the embodiment preferably satisfies the following conditional expression (5).

$$1.0 \leq |f1A/f1B| \tag{5}$$

where f1A: focal length of first A lens component G1A
f1B: focal length of first B lens component G1B The conditional expression (5) defines a ratio between a focal length f1A of the first A lens component G1A forming the first lens group G1, and a focal length f1B of the first B lens component G1B forming the first lens group G1. When the result falls out of the range of the conditional expression (5), it is undesirable since the focal length of the first B lens component G1B of the first lens group G1 is elongated and the negative refracting power is reduced, whereby the Petzval sum is increased. Note that to ensure the effect of the conditional expression (5), a lower limit value of the conditional expression (5) is preferably set to 1.2.

Additionally, the ocular lens EL of the embodiment preferably satisfies the following conditional expression (6).

$$0.5 \leq (-f1B)/f \leq 10.0 \tag{6}$$

where f: focal length of entire ocular lens EL
f1B: focal length of first B lens component G1B The conditional expression (6) defines a ratio between the focal length f1B of the first B lens component G1B included in the first lens group G1, and the entire focal length f. When the result exceeds an upper limit value of the conditional expression (6), it is undesirable since the negative refracting power of the first B lens component G1B is reduced, and the effect of reducing the Petzval sum is deteriorated. Note that to ensure the effect of the conditional expression (6), an upper limit value of the conditional expression (6) is preferably set to 7.0, and more preferably to 6.0. Conversely, when the result falls below a lower limit value of the conditional expression (6), it is undesirable since the negative refracting power in the first B lens component G1B becomes excessively large, the load of the refractive effect in the first B lens component G1B becomes large, which causes deterioration in aberration. Note that to ensure the effect of the conditional expression (6), a lower limit value of the conditional expression (6) is preferably set to 0.8, and more preferably to 1.2.

Additionally, the ocular lens EL of the embodiment preferably satisfies the following conditional expression (7).

$$15 \text{ [mm]} \leq f2 \leq 35 \text{ [mm]} \tag{7}$$

where f2: focal length of second lens group

The conditional expression (7) defines a focal length f2 of the second lens group G2. Generally, the eye relief of an ocular lens depends more on the focal length of a positive lens component on the eye side than on the field stop. To ensure a sufficient length of eye relief while correcting aberration in the periphery of the visual field at an apparent field of view of 70 degrees or larger, the focal length of the positive lens component on the eye side needs to be about 1.5 times the eye relief. This is because in order to correct aberration sufficiently over a wide angle of view, at least about five lenses are required, the larger field of view increases the lens diameter and therefore increases the central thickness of the lens, whereby an eye relief is more difficult to ensure an eye relief as compared to an ocular lens with a normal apparent field of view of about 50 degrees to 60 degrees. When the result falls below a lower limit value of the conditional expression (7), a sufficient eye relief cannot be ensured. Note that to ensure the effect of the lower limit value and the conditional expression (7), the lower limit value of the conditional expression (7) is preferably set to 18 [mm], and more preferably to 20 [mm]. Conversely, when the result exceeds an upper limit value of the conditional expression (7), it is undesirable since the lens diameter of the second lens group G2 is increased, and the interpupillary distance cannot be ensured in observation with both eyes such as with binoculars. Note that to ensure the effect of the conditional expression (7), the upper limit value of the conditional expression (7) is preferably set to 30 [mm], and more preferably to 25 [mm].

Additionally, the ocular lens EL of the embodiment preferably satisfies the following conditional expression (8).

$$-5.00 \leq G2Arf/f \leq -0.75 \tag{8}$$

where f: focal length of entire ocular lens EL
G2Arf: radius of curvature of lens surface of second A lens component closest to object side The conditional expression (8) defines a ratio between a radius of curvature G2Arf of a lens surface closest to the object side of a second A lens component G2A of the second lens group G2, and the focal length f of the entire ocular lens EL. When the result falls below a lower limit value of the conditional expression (8), it is undesirable since the negative refractive effect on a lens surface closest to the object side of the second A lens component G2A is reduced, whereby the Petzval sum increases, and the curvature of field and astigmatism are deteriorated. Note that to ensure the effect of the conditional expression (8), a lower limit value of the conditional expression (8) is preferably set to −4.00, and more preferably to −3.30. Conversely, when the result exceeds an upper limit value of the conditional expression (8), it is undesirable since the negative refractive effect on the lens surface closest to the object side of the second A lens component G2A becomes excessively strong, which leads to a sudden deterioration in aberration in the periphery of the visual field. Note that to ensure the effect of the conditional expression (8), an upper limit value of the conditional expression (8) is preferably set to −0.88, and more preferably to −0.95.

Additionally, the ocular lens EL of the embodiment preferably satisfies the following conditional expression (9).

$$-2.20 \leq G2Arr/f \leq -0.75 \tag{9}$$

f: focal length of entire ocular lens EL
G2Arr: radius of curvature of lens surface of second A lens component G2A closest to eye side The conditional expression (9) defines a ratio between a radius of curvature G2Arr of a lens surface closest to the eye side of the second A lens component G2A of the second lens group G2, and the focal length f of the entire ocular lens EL. When the result falls below a lower limit value of the conditional expression (9), it is undesirable since the positive refractive effect on the lens surface closest to the eye side of the second A lens component G2A is reduced, and the diameter of following lens is increased. Note that to ensure the effect of the conditional expression (9), a lower limit value of the conditional expression (9) is preferably set to −1.75, and more preferably to −1.65. Conversely, when the result exceeds an upper limit value of the conditional expression (9), it is undesirable since the positive refractive effect on the lens surface closest to the eye side of the second A lens component G2A becomes excessively large, which leads to deterioration in aberration in the periphery of the visual field. Note that to ensure the effect of the conditional expression (9), an upper limit value of the conditional expression (9) is preferably set to −0.88, and more preferably to −0.95.

Additionally, in the ocular lens EL of the embodiment, the second A lens component G2A of the second lens group G2 is made up of a cemented lens, and preferably satisfies the following conditional expression (10).

$$3 \le |G2Ars/f2| \tag{10}$$

where
f2: focal length of second lens group G2
G2Ars: radius of curvature of joined surface of second A lens component G2A The conditional expression (10) defines a ratio between a radius of curvature G2Ars of a joined surface of the second A lens component G2A forming the second lens group G2 which is a cemented lens, and the focal length f2 of the second lens group G2. When the result falls out of the range of the conditional expression (10), the radius of curvature of the joined surface is reduced, and the lens central thickness needs to be increased to ensure the edge thickness of the positive lens component. As a result, it is undesirable since the total optical length is elongated, and the eye relief is reduced. Note that to ensure the effect of the conditional expression (10), a lower limit value of the conditional expression (10) is preferably set to 4.

The second lens group G2 of the ocular lens EL of the embodiment is preferably formed of, from the object side in this order, a second A lens component which is a cemented lens, a second B lens component which is a single lens having positive refracting power, a second C lens component which is a single lens having positive refracting power, and a second D lens component which is a cemented lens whose convex surface is directed toward the object side. With this configuration, aberrations can be corrected favorably, and an excellent optical performance can be achieved.

The first B lens component G1B forming the first lens group G1 of the ocular lens EL of the embodiment is preferably a single lens. Instead, the first B lens component G1B is preferably a cemented lens whose concave surface is directed toward the object side. With this configuration, aberrations can be corrected favorably, and an excellent optical performance can be achieved.

The second D lens component G2D forming the second lens group G2 of the ocular lens EL of the embodiment is preferably a cemented lens formed of, from the object side in this order, a lens having positive refracting power and a lens having negative refracting power. With this configuration, aberrations can be corrected favorably, and an excellent optical performance can be achieved.

By configuring the ocular lens EL of the embodiment in this manner, it is possible to provide an ocular lens in which aberrations are corrected favorably over a sufficiently wide angle of view, the total length is not elongated while a sufficient eye relief is obtained, and increase in the lens diameter is suppressed.

Although the present invention has been described by use of embodiment, the technical scope of the invention is not limited to the scope described in the above embodiments. It is apparent to those skilled in the art that various modifications and improvements may be made in the above embodiments. It is clear from the scope of claims that such modified and improved forms may also be included in the technical scope of the invention.

It should be noted that the order of processing such as operations, procedures, steps and stages in the apparatus, system, program, and method indicated in the scope of claims, specification, and drawings may be performed in any order, unless specifically stated as "before," "previously," or the like, or output of the former process is used in the latter process. Even if an operation flow in the scope of claims, specification, and drawings is referred to by use of expressions such as "firstly," and "next" for the sake of convenience, this does not necessarily mean that the order is essential to the operation flow.

EXAMPLES

Hereinbelow, five examples of the ocular lens EL will be described. FIGS. 11, 13, 15, 17, and 19 each show a lens configuration of the ocular lens EL of first to fifth examples. Here, reference sign EP in each drawing indicates an eye point. Note that the ocular lens of the present invention only needs to satisfy the aforementioned conditions, and is not limited to the lens configuration of the examples.

First Example

FIG. 11 shows an ocular lens EL1 of a first embodiment. The ocular lens EL1 includes, from the object side in this order, a first lens group G1 having negative refracting power, and a second lens group G2 having positive refracting power. An object-side focal plane I of the second lens group G2 is positioned between the first lens group G1 and the second lens group G2.

The first lens group G1 is made up of, from the object side in this order, a first A lens component G1A which is a cemented lens in which a positive meniscus lens L11 whose convex surface is directed toward the object side and a negative meniscus lens L12 whose convex surface is directed toward the object side are joined, and a first B lens component G1B which is a flat concave negative lens L13 whose concave surface is directed toward the eye side. The second lens group G2 is made up of, from the object side in this order, a second A lens component G2A which is a cemented lens in which a negative meniscus lens L21 whose concave surface is directed toward the object side and a positive meniscus lens L22 whose concave surface is directed toward the object side are joined, a second B lens component G2B which is a biconvex positive lens L23, a second C lens component G2C which is a biconvex positive lens L24, and a second D lens component G2D which is a cemented lens in which a biconvex positive lens L25 and a biconcave negative lens L26 are joined. Note that the first A lens component G1A is a meniscus cemented lens whose convex surface is directed toward the object side, and the second A lens component G2A is a meniscus cemented lens whose concave surface is directed toward the object side.

Table 1 shows a variety of parameters of the ocular lens EL1 of the first example. In Table 1, f indicates the overall focal length of the ocular lens EL1, 2ω indicates the angle of view (apparent field of view) of the ocular lens EL1, and ER indicates the length of the eye relief. In Table 1, a first field m indicates the number of each optical surface from the object side, a second field r indicates the radius of curvature of each optical surface, a third field d indicates the distance on the optical axis (inter-surface distance) from each optical surface to the next optical surface, a fourth field nd indicates a refractive index at a d line, and a fifth field vd indicates the Abbe number. Here, the refractive index 1.000000 of air is omitted. Reference sign ∞ in the radius of curvature indicates a flat surface. The lens group focal length indicates the number of the starting surface of the first lens group G1 and the second lens group G2, and the focal length thereof.

Here, the units of the radius of curvature r, inter-surface distance d, focal length f, and other lengths given in all of the following parameters are generally "mm" if not specified otherwise. However, in an optical system, the same optical performance is obtained when the length is proportionally magnified or proportionally minified, and therefore the units are not limited to "mm," and other appropriate units may be used. The same descriptions of reference numerals and parameters table apply to the following other examples.

TABLE 1

First Example

[Overall parameters]

f = 26.4
2ω = 72.8°
ER = 18.6

[Lens data]
Lens data

| m | r | d | nd | vd |
|---|---|---|----|----|
| 1 | 22.0 | 8.0 | 1.7950 | 45.3 |
| 2 | 52.8 | 3.0 | 1.7015 | 41.2 |
| 3 | 15.2 | 6.9 | | |
| 4 | ∞ | 1.5 | 1.4978 | 82.5 |
| 5 | 52.8 | 22.3 | | |
| 6 | −28.0 | 2.5 | 1.8052 | 25.4 |
| 7 | −102.0 | 10.2 | 1.7550 | 52.3 |
| 8 | −30.0 | 0.5 | | |
| 9 | 206.5 | 9.2 | 1.7292 | 54.7 |
| 10 | −63.8 | 0.5 | | |
| 11 | 61.5 | 7.5 | 1.7292 | 54.7 |
| 12 | −392.0 | 0.5 | | |
| 13 | 30.0 | 12.5 | 1.5932 | 67.9 |
| 14 | −61.5 | 2.0 | 1.7174 | 29.5 |
| 15 | 35.0 | ER | | |

[Lens group focal length]

| lens group | starting surface | focal length |
|---|---|---|
| First lens group | 1 | −115.3 |
| Second lens group | 6 | 22.9 |

[Value corresponding to conditional expression]

f1A = −800.3
f1B = −106.1
(1) (−f1)/f = 4.37
(2) D/f = 0.84
(3) G1Arf/f = 0.83
(4) G1Arf/G1Arr = 1.45
(5) |f1A/f1B| = 7.54
(6) (−f1B)/f = 4.02
(7) f2 = 22.9
(8) G2Arf/f = −1.06
(9) G2Arr/f = −1.14
(10) |G2Ars/f2| = 4.45

As has been described, the ocular lens EL1 of the first example satisfies all of the above conditional expressions (1) to (10).

FIG. 12 shows the aberration diagrams of the spherical aberration, astigmatism, and distortion of the ocular lens EL1 of the first example. Here, each aberration is the image-forming aberration of when a ray (d line) is incident from the eye point side, and in the astigmatism diagram, the solid line indicates the sagittal image plane and the broken line indicates the meridional image plane, while in the diagrams, Fno indicates the F number of the ocular lens EL, and ω indicates the half angle of view of the apparent field of view of the ocular lens EL. Note that the same descriptions of the aberration diagram applies to the following examples. As is clear from the aberration diagrams shown in FIG. 12, in the ocular lens EL1 of the first example, the aberrations are favorably corrected over a sufficiently wide angle of view, the total length is not elongated while a sufficient eye relief is obtained, and increase in the lens diameter is suppressed.

Second Example

FIG. 13 shows an ocular lens EL2 of a second example. The ocular lens EL2 includes, from the object side in this order, a first lens group G1 having negative refracting power, and a second lens group G2 having positive refracting power. An object-side focal plane I of the second lens group G2 is positioned between the first lens group G1 and the second lens group G2.

The first lens group G1 is made up of, from the object side in this order, a first A lens component G1A which is a cemented lens in which a positive meniscus lens L11 whose convex surface is directed toward the object side and a negative meniscus lens L12 whose convex surface is directed toward the object side are joined, and a first B lens component G1B which is a negative meniscus lens L13 whose concave surface is directed toward the object side. The second lens group G2 is made up of, from the object side in this order, a second A lens component G2A which is a cemented lens in which a negative meniscus lens L21 whose concave surface is directed toward the object side and a positive meniscus lens L22 whose concave surface is directed toward the object side are joined, a second B lens component G2B which is a biconvex positive lens L23, a second C lens component G2C which is a biconvex positive lens L24, and a second D lens component G2D which is a cemented lens in which a biconvex positive lens L25 and a biconcave negative lens L26 are joined. Note that the first A lens component G1A is a meniscus cemented lens whose convex surface is directed toward the object side, and the second A lens component G2A is a meniscus cemented lens whose concave surface is directed toward the object side.

Table 2 shows a variety of parameters of the ocular lens EL2 of the second example.

TABLE 2

Second Example

[Overall parameters]

f = 27.8
2ω = 90.0°
ER = 20.3

[Lens data]
Lens data

| m | r | d | nd | vd |
|---|---|---|----|----|
| 1 | 25.4 | 13.0 | 1.7725 | 49.6 |
| 2 | 75.0 | 3.0 | 1.7200 | 43.7 |
| 3 | 16.5 | 8.4 | | |
| 4 | −31.0 | 2.5 | 1.5168 | 63.9 |
| 5 | −79.2 | 20.3 | | |
| 6 | −28.5 | 2.2 | 1.8052 | 25.4 |
| 7 | −102.0 | 10.2 | 1.7725 | 49.6 |
| 8 | −30.0 | 0.5 | | |

TABLE 2-continued

Second Example

| 9  | 206.5  | 6.8  | 1.7725 | 49.6 |
|----|--------|------|--------|------|
| 10 | −102.0 | 0.5  |        |      |
| 11 | 61.5   | 9.0  | 1.7725 | 49.6 |
| 12 | −206.5 | 0.5  |        |      |
| 13 | 31.0   | 12.2 | 1.5952 | 67.7 |
| 14 | −75.0  | 2.0  | 1.8052 | 25.4 |
| 15 | 50.0   | ER   |        |      |

[Lens group focal length]

| lens group | starting surface | focal length |
|---|---|---|
| First lens group | 1 | −109.7 |
| Second lens group | 6 | 23.1 |

[Value corresponding to conditional expression]

f1A = −568.2
f1B = −100.3
(1) (−f1)/f = 3.95
(2) D/f = 0.73
(3) G1Arf/f = 0.91
(4) G1Arf/G1Arr = 1.54
(5) |f1A/f1B| = 5.67
(6) (−f1B)/f = 3.61
(7) f2 = 23.1
(8) G2Arf/f = −1.03
(9) G2Arr/f = −1.08
(10) |G2Ars/f2| = 4.42

As has been described, the ocular lens EL2 of the second example satisfies all of the above conditional expressions (1) to (10).

FIG. 14 shows the aberration diagrams of the spherical aberration, astigmatism, and distortion of the ocular lens EL2 of the second example. As is clear from the aberration diagrams shown in FIG. 14, in the ocular lens EL2 of the second example, the aberrations are favorably corrected over a sufficiently wide angle of view, the total length is not elongated while a sufficient eye relief is obtained, and increase in the lens diameter is suppressed.

Third Example

FIG. 15 shows an ocular lens EL3 of a third example. The ocular lens EL3 includes, from the object side in this order, a first lens group G1 having negative refracting power, and a second lens group G2 having positive refracting power. An object-side focal plane I of the second lens group G2 is positioned between the first lens group G1 and the second lens group G2.

The first lens group G1 is made up of, from the object side in this order, a first A lens component G1A which is a cemented lens in which a positive meniscus lens L11 whose convex surface is directed toward the object side and a negative meniscus lens L12 whose convex surface is directed toward the object side are joined, and a first B lens component G1B which is a cemented lens in which a biconcave negative lens L13 and a positive meniscus lens L14 whose convex surface is directed toward the object side are joined. The second lens group G2 is made up of, from the object side in this order, a second A lens component G2A which is a cemented lens in which a negative meniscus lens L21 whose concave surface is directed toward the object side and a positive meniscus lens L22 whose concave surface is directed toward the object side are joined, a second B lens component G2B which is a biconvex positive lens L23, a second C lens component G2C which is a biconvex positive lens L24, and a second D lens component G2D which is a cemented lens in which a biconvex positive lens L25 and a biconcave negative lens L26 are joined. Note that the first A lens component G1A is a meniscus cemented lens whose convex surface is directed toward the object side, and the second A lens component G2A is a meniscus cemented lens whose concave surface is directed toward the object side.

Table 3 shows a variety of parameters of the ocular lens EL3 of the third example.

TABLE 3

Third Example

[Overall parameters]

f = 20.5
2ω = 90.0°
ER = 15.8

[Lens data]
Lens data

| m | r | d | nd | νd |
|---|---|---|---|---|
| 1 | 20.7 | 9.0 | 1.7950 | 45.3 |
| 2 | 102.0 | 2.0 | 1.7234 | 37.9 |
| 3 | 14.3 | 9.8 | | |
| 4 | −24.8 | 2.0 | 1.4978 | 82.5 |
| 5 | 31.0 | 4.0 | 1.8052 | 25.4 |
| 6 | 61.5 | 20.0 | | |
| 7 | −59.5 | 2.5 | 1.8052 | 25.4 |
| 8 | −314.0 | 12.7 | 1.5932 | 67.9 |
| 9 | −30.4 | 0.5 | | |
| 10 | 490.0 | 9.0 | 1.5932 | 67.9 |
| 11 | −56.0 | 0.5 | | |
| 12 | 47.5 | 8.5 | 1.5932 | 67.9 |
| 13 | ∞ | 0.5 | | |
| 14 | 27.5 | 12.0 | 1.5932 | 67.9 |
| 15 | −102.0 | 2.0 | 1.7174 | 29.5 |
| 16 | 50.3 | ER | | |

[Lens group focal length]

| lens group | starting surface | focal length |
|---|---|---|
| First lens group | 1 | −52.5 |
| Second lens group | 7 | 21.3 |

[Value corresponding to conditional expression]

f1A = −1271.3
f1B = −42.3
(1) (−f1)/f = 2.56
(2) D/f = 0.98
(3) G1Arf/f = 1.01
(4) G1Arf/G1Arr = 1.45
(5) |f1A/f1B| = 30.05
(6) (−f1B)/f = 2.06
(7) f2 = 21.3
(8) G2Arf/f = −2.90
(9) G2Arr/f = −1.48
(10) |G2Ars/f2| = 14.74

As has been described, the ocular lens EL3 of the third example satisfies all of the above conditional expressions (1) to (10).

FIG. 16 shows the aberration diagrams of the spherical aberration, astigmatism, and distortion of the ocular lens EL3 of the third example. As is clear from the aberration diagrams shown in FIG. 16, in the ocular lens EL3 of the third example, the aberrations are favorably corrected over a sufficiently wide angle of view, the total length is not elongated while a sufficient eye relief is obtained, and increase in the lens diameter is suppressed.

Fourth Example

FIG. 17 shows an ocular lens EL4 of a fourth example. The ocular lens EL4 includes, from the object side in this order, a first lens group G1 having negative refracting power, and a second lens group G2 having positive refracting power. An object-side focal plane I of the second lens group G2 is positioned between the first lens group G1 and the second lens group G2.

The first lens group G1 is made up of, from the object side in this order, a first A lens component G1A which is a cemented lens in which a biconvex positive lens L11 and a biconcave negative lens L12 are joined, and a first B lens component G1B which is a cemented lens in which a biconcave negative lens L13 and a biconvex positive lens L14 are joined. The second lens group G2 is made up of, from the object side in this order, a second A lens component G2A which is a cemented lens in which a biconcave negative lens L21 and a biconvex positive lens L22 are joined, a second B lens component G2B which is a biconvex positive lens L23, a second C lens component G2C which is a biconvex positive lens L24, and a second D lens component G2D which is a cemented lens in which a biconvex positive lens L25 and a biconcave negative lens L26 are joined. Note that the first A lens component G1A is a meniscus cemented lens whose convex surface is directed toward the object side, and the second A lens component G2A is a meniscus cemented lens whose concave surface is directed toward the object side.

Table 4 shows a variety of parameters of the ocular lens EL4 of the fourth example.

TABLE 4

Fourth Example

[Overall parameters]

f = 20.4
2ω = 90.0°
ER = 15.6

[Lens data]
Lens data

| m | r | d | nd | vd |
|---|---|---|---|---|
| 1 | 25.4 | 11.0 | 1.7725 | 49.6 |
| 2 | −314.0 | 5.5 | 1.8061 | 33.3 |
| 3 | 15.2 | 8.8 | | |
| 4 | −20.2 | 2.0 | 1.4978 | 82.6 |
| 5 | 31.0 | 5.7 | 1.8052 | 25.4 |
| 6 | −255.0 | 15.4 | | |
| 7 | −59.5 | 2.2 | 1.8052 | 25.4 |
| 8 | 102.0 | 15.3 | 1.5952 | 67.7 |
| 9 | −31.0 | 0.5 | | |
| 10 | 102.0 | 8.5 | 1.6030 | 65.5 |
| 11 | −102.0 | 0.5 | | |
| 12 | 50.0 | 9.5 | 1.6030 | 65.5 |
| 13 | −255.0 | 0.5 | | |
| 14 | 25.4 | 10.7 | 1.6030 | 65.5 |
| 15 | −314.0 | 1.8 | 1.8052 | 25.4 |
| 16 | 45.6 | ER | | |

[Lens group focal length]

| lens group | starting surface | focal length |
|---|---|---|
| First lens group | 1 | −61.5 |
| Second lens group | 7 | 21.0 |

TABLE 4-continued

Fourth Example

[Value corresponding to conditional expression]

f1A = −128.2
f1B = −90.9
(1) (−f1)/f = 3.01
(2) D/f = 0.75
(3) G1Arf/f = 1.25
(4) G1Arf/G1Arr = 1.67
(5) |f1A/f1B| = 1.41
(6) (−f1B)/f = 4.46
(7) f2 = 21.0
(8) G2Arf/f = −2.92
(9) G2Arr/f = −1.52
(10) |G2Ars/f2| = 4.86

As has been described, the ocular lens EL4 of the fourth example satisfies all of the above conditional expressions (1) to (10).

FIG. 18 shows the aberration diagrams of the spherical aberration, astigmatism, and distortion of the ocular lens EL4 of the fourth example. As is clear from the aberration diagrams shown in FIG. 18, in the ocular lens EL4 of the fourth example, the aberrations are favorably corrected over a sufficiently wide angle of view, the total length is not elongated while a sufficient eye relief is obtained, and increase in the lens diameter is suppressed.

Fifth Example

FIG. 19 shows an ocular lens EL5 of a fifth example. The ocular lens EL5 includes, from the object side in this order, a first lens group G1 having negative refracting power, and a second lens group G2 having positive refracting power. An object-side focal plane I of the second lens group G2 is positioned between the first lens group G1 and the second lens group G2.

The first lens group G1 is made up of, from the object side in this order, a first A lens component G1A which is a cemented lens in which a positive meniscus lens L11 whose convex surface is directed toward the object side and a negative meniscus lens L12 whose convex surface is directed toward the object side are joined, and a first B lens component G1B which is a cemented lens in which a biconcave negative lens L13 and a biconvex positive lens L14 are joined. The second lens group G2 is made up of, from the object side in this order, a second A lens component G2A which is a cemented lens in which a biconcave negative lens L21 and a biconvex positive lens L22 are joined, a second B lens component G2B which is a biconvex positive lens L23, a second C lens component G2C which is a positive meniscus lens L24 whose convex surface is directed toward the object side, and a second D lens component G2D which is a cemented lens in which a biconvex positive lens L25 and a biconcave negative lens L26 are joined. Note that the first A lens component G1A is a meniscus cemented lens whose convex surface is directed toward the object side, and the second A lens component G2A is a meniscus cemented lens whose concave surface is directed toward the object side.

Table 5 shows a variety of parameters of the ocular lens EL5 of the fifth example.

TABLE 5

Fifth Example

[Overall parameters]

f = 21.1
2ω = 90.0°
ER = 15.4

[Lens data]
Lens data

| m | r | d | nd | vd |
|---|---|---|---|---|
| 1 | 25.5 | 10.9 | 1.7725 | 49.6 |
| 2 | 130.4 | 5.5 | 1.8061 | 33.3 |
| 3 | 16.0 | 8.0 | | |
| 4 | −22.3 | 2.0 | 1.4978 | 82.5 |
| 5 | 45.2 | 5.7 | 1.8052 | 25.4 |
| 6 | −290.7 | 19.3 | | |
| 7 | −57.5 | 2.0 | 1.8052 | 25.4 |
| 8 | 410.0 | 15.0 | 1.5932 | 67.9 |
| 9 | −30.0 | 0.2 | | |
| 10 | 65.0 | 10.6 | 1.6030 | 65.5 |
| 11 | −103.6 | 0.2 | | |
| 12 | 48.7 | 6.5 | 1.6030 | 65.5 |
| 13 | 244.0 | 0.2 | | |
| 14 | 25.7 | 10.1 | 1.6030 | 65.5 |
| 15 | −274.5 | 1.8 | 1.8052 | 25.4 |
| 16 | 43.0 | ER | | |

[Lens group focal length]

| lens group | starting surface | focal length |
|---|---|---|
| First lens group | 1 | −66.0 |
| Second lens group | 7 | 21.4 |

[Value corresponding to conditional expression]

f1A = −172.1
f1B = −81.1
(1) (−f1)/f = 3.13
(2) D/f = 0.91
(3) G1Arf/f = 1.21
(4) G1Arf/G1Arr = 1.59
(5) |f1A/f1B| = 2.12
(6) (−f1B)/f = 3.84
(7) f2 = 21.4
(8) G2Arf/f = −2.73
(9) G2Arr/f = −1.42
(10) |G2Ars/f2| = 19.16

As has been described, the ocular lens EL5 of the fifth example satisfies all of the above conditional expressions (1) to (10).

FIG. 20 shows the aberration diagrams of the spherical aberration, astigmatism, and distortion of the ocular lens EL5 of the fifth example. As is clear from the aberration diagrams shown in FIG. 20, in the ocular lens EL5 of the fifth example, the aberrations are favorably corrected over a sufficiently wide angle of view, the total length is not elongated while a sufficient eye relief is obtained, and increase in the lens diameter is suppressed.

REFERENCE SIGNS LIST

10 binoculars
26, 36 main body (telescope lens-barrel)
40 connection portion (connection structure)
101, 201 objective lens group (objective lens)
121, 221 ocular lens group (EL (EL1 to EL5) ocular lens)
110, 210 erecting prism (Abbe-Koenig prism)
112, 212 roof prism (roof prism)
113, 213 edge line
113a, 213a edge line end G1 first lens group
G1A first A lens component
G1B first B lens component
G2 second lens group
G2A second A lens component
G2B second B lens component
G2C second C lens component
G2D second D lens component

The invention claimed is:

1. An ocular lens comprising:
from an object side in this order,
a first lens group having negative refracting power; and
a second lens group having positive refracting power, wherein:
an object-side focal plane of the second lens group is positioned between the first lens group and the second lens group;
the first lens group includes, from the object side in this order,
a meniscus first A lens component whose convex surface is directed toward the object side, and
a first B lens component having negative refracting power;
the second lens group includes, in a position closest to the object side, a meniscus second A lens component whose concave surface is directed toward the object side; and
satisfies the condition of the following expressions:

$$1.8 \leq (-f1)/f \leq 6.0$$

$$0.5 \leq D/f \leq 2.0$$

where
f is an entire focal length of the ocular lens,
f1 is a focal length of the first lens group, and
D is an air space between the first lens group and the second lens group, and
wherein
the ocular lens satisfies the condition of the following expression:

$$0.5 \leq G1Arf/f \leq 2.0$$

where
G1Arf is a radius of curvature of a lens surface closest to the object side of the first A lens component.

2. The ocular lens according to claim 1, wherein the ocular lens satisfies the condition of the following expression:

$$1.0 \leq G1Arf/G1Arr \leq 10.0$$

where
G1Arr is the radius of curvature of a lens surface closest to an eye side of the first A lens component.

3. The ocular lens according to claim 1, wherein the ocular lens satisfies the condition of the following expression:

$$1.0 \leq |f1A/f1B|$$

where
f1A is the focal length of the first A lens component, and
f1B is the focal length of the first B lens component.

4. The ocular lens according to claim 1, wherein the ocular lens satisfies the condition of the following expression:

$$0.5 \leq (-f1B)/f \leq 10.0$$

where
f1B is the focal length of the first B lens component.

5. The ocular lens according to claim 1, wherein the ocular lens satisfies the condition of the following expression:

$$15 \leq f2 \leq 35$$

where
f2 is the focal length of the second lens group.

6. The ocular lens according to claim 1, wherein the ocular lens satisfies the condition of the following expression:

$$-5.00 \leq G2Arf/f \leq -0.75$$

where
G2Arf is the radius of curvature of the lens surface closest to the object side of the second A lens component.

7. The ocular lens according to claim 1, wherein the ocular lens satisfies the condition of the following expression:

$$-2.20 \leq G2Arr/f \leq -0.75$$

G2Arr is the radius of curvature of the lens surface closest to the eye side of the second A lens component.

8. The ocular lens according to claim 1, wherein the second A lens component is made up of a cemented lens, and the ocular lens satisfies the condition of the following expression:

$$3 \leq |G2Ars/f2|$$

where
f2 is the focal length of the second lens group, and
G2Ars is the radius of curvature of a joined surface of the second A lens component.

9. The ocular lens according to claim 1, wherein the second lens group is formed of, from the object side in this order,
the second A lens component which is a cemented lens,
a second B lens component which is a single lens having positive refracting power,
a second C lens component which is a single lens having positive refracting power, and
a second D lens component which is a cemented lens whose convex surface is directed toward the object side.

10. The ocular lens according to claim 9, wherein the second D lens component is a cemented lens formed of, from the object side in this order, a lens having positive refracting power, and a lens having negative refracting power.

11. The ocular lens according to claim 1, wherein the first B lens component is a single lens.

12. The ocular lens according to claim 1, wherein the first B lens component is a cemented lens whose concave surface is directed toward the object side.

13. Binoculars comprising:
an objective lens;
the ocular lens according to claim 1; and
a first lens-barrel and a second lens-barrel.

* * * * *